US009779365B2

(12) United States Patent
Smullin et al.

(10) Patent No.: US 9,779,365 B2
(45) Date of Patent: Oct. 3, 2017

(54) COMPUTER-IMPLEMENTED SYSTEM AND METHOD FOR MANAGING INTERCHANGEABLE EV CHARGING-CAPABLE PARKING SPACES

(71) Applicant: Palo Alto Research Center Incorporated, Palo Alto, CA (US)

(72) Inventors: Sylvia Smullin, Menlo Park, CA (US); Mark J. Stefik, Portola Valley, CA (US); David Eric Schwartz, San Carlos, CA (US); Daniel H. Greene, Sunnyvale, CA (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 551 days.

(21) Appl. No.: 13/624,883

(22) Filed: Sep. 21, 2012

(65) Prior Publication Data
US 2014/0089016 A1   Mar. 27, 2014

(51) Int. Cl.
*G06Q 10/02*   (2012.01)
(52) U.S. Cl.
CPC .................................. *G06Q 10/02* (2013.01)
(58) Field of Classification Search
CPC ....... G06C 50/06; G06C 50/30; G07F 15/005; G07F 15/003; B60L 11/1809;
(Continued)

(56) References Cited

U.S. PATENT DOCUMENTS 3,349,368 A  10/1967  Kates
4,137,662 A   2/1979  Baumer
(Continued)

FOREIGN PATENT DOCUMENTS

CH      703468     1/2012
JP    04335697    11/1992
(Continued)

OTHER PUBLICATIONS

Smith et al., "Intelligent Transportation Systems and Truck Parking," Feb. 2005.
(Continued)

*Primary Examiner* — Igor Borissov
(74) *Attorney, Agent, or Firm* — Patrick J. S. Inouve; Krista A. Wittman

(57) ABSTRACT

A centralized server-based system and method for managing and reserving parking spaces capable of charging an EV, that is, a plug-in hybrid or fully electric vehicle, treats sets of parking spaces as interchangeable pooled resources. An EV motorist can book a reservation with charging of the EV by specifying parking in a desired location. Parking spaces serve dual uses for parking alone or parking with charging. The parking spaces are handled as a common parking pool, such as on one side of a city block, and each space has equal access to a charging station. The server determines charging capacity availability within a time window and the motorist can choose a parking time up to or beyond, if permitted, the maximum charging time needed to charge the EV. Non-EV motorists can similarly reserve parking within a parking pool with the server ensuring optimal use of charging capacity and parking spaces.

21 Claims, 11 Drawing Sheets

(58) Field of Classification Search
CPC ............ B60L 11/1816; Y02T 10/7072; Y02T 90/166; Y02T 90/167; Y02T 90/12; Y04S 50/10; G06Q 10/02; G06Q 10/025
USPC ................ 705/5, 6; 320/108, 109, 137, 155; 340/870.09
See application file for complete search history.

(56) References Cited

U.S. PATENT DOCUMENTS

| | | |
|---|---|---|
| 4,310,890 A | 1/1982 | Trehn et al. |
| 4,356,903 A | 11/1982 | Lemelson et al. |
| 4,532,418 A | 7/1985 | Meese et al. |
| 5,266,947 A | 11/1993 | Fujiwara et al. |
| 5,432,508 A | 7/1995 | Jackson |
| 5,432,509 A | 7/1995 | Kajiwara |
| 5,570,771 A | 11/1996 | Jacobs |
| 5,710,557 A | 1/1998 | Schuette |
| 5,710,743 A | 1/1998 | Dee et al. |
| 5,740,050 A | 4/1998 | Ward, II |
| 5,770,845 A | 6/1998 | Hjelmvik |
| 5,777,951 A | 7/1998 | Mitschele |
| 5,841,369 A | 11/1998 | Sutton et al. |
| 5,910,782 A | 6/1999 | Schmitt et al. |
| 6,078,272 A | 6/2000 | Jacobs et al. |
| 6,081,205 A | 6/2000 | Williams |
| 6,081,206 A | 6/2000 | Kielland |
| 6,102,285 A | 8/2000 | Elias |
| 6,111,522 A | 8/2000 | Hiltz et al. |
| 6,188,328 B1 | 2/2001 | Ho |
| 6,243,028 B1 | 6/2001 | Krygler et al. |
| 6,243,029 B1 | 6/2001 | Tomer |
| 6,275,169 B1 | 8/2001 | Krygler et al. |
| 6,373,401 B2 | 4/2002 | Ho |
| 6,411,895 B1 | 6/2002 | Lau et al. |
| 6,437,692 B1 | 8/2002 | Petite et al. |
| 6,459,386 B1 | 10/2002 | Jones |
| 6,493,676 B1 | 12/2002 | Levy |
| 6,505,774 B1 | 1/2003 | Fulcher et al. |
| 6,513,711 B1 | 2/2003 | Hjelmvik |
| 6,519,329 B1 | 2/2003 | Hjelmvik |
| 6,577,248 B1 | 6/2003 | Hjelmvik |
| 6,750,786 B1 | 6/2004 | Racunas |
| 6,791,473 B2 | 9/2004 | Kibria et al. |
| RE38,626 E | 10/2004 | Kielland |
| 6,812,857 B1 | 11/2004 | Kassab et al. |
| 6,816,085 B1 | 11/2004 | Haynes et al. |
| 6,823,317 B1 | 11/2004 | Ouimet et al. |
| 6,885,311 B2 | 4/2005 | Howard et al. |
| 6,889,899 B2 | 5/2005 | Silberberg |
| 6,927,700 B1 | 8/2005 | Quinn |
| 6,929,179 B2 | 8/2005 | Fulcher et al. |
| 6,946,974 B1 | 9/2005 | Racunas Jr. |
| 6,970,101 B1 | 11/2005 | Squire et al. |
| 7,002,487 B1 | 2/2006 | Montgomery, Sr. |
| 7,014,355 B2 | 3/2006 | Potter, Sr. et al. |
| 7,019,670 B2 | 3/2006 | Bahar |
| 7,123,166 B1 | 10/2006 | Haynes et al. |
| 7,194,417 B1 | 3/2007 | Jones |
| 7,237,716 B2 | 7/2007 | Silberberg |
| 7,277,010 B2 | 10/2007 | Joao |
| RE40,013 E | 1/2008 | Quinn |
| 7,321,317 B2 | 1/2008 | Nath et al. |
| 7,382,244 B1 | 6/2008 | Donovan et al. |
| 7,393,134 B2 | 7/2008 | Mitschele |
| 7,474,589 B2 | 1/2009 | Showen et al. |
| 7,579,964 B2 | 8/2009 | Nath et al. |
| 7,652,593 B1 | 1/2010 | Haynes et al. |
| 7,667,619 B2 | 2/2010 | Montgomery, Sr. |
| 7,688,225 B1 | 3/2010 | Haynes et al. |
| 7,768,426 B2 | 8/2010 | Groft |
| 7,791,501 B2 | 9/2010 | Ioli |
| 7,791,503 B2 | 9/2010 | Breed et al. |
| 7,805,239 B2 | 9/2010 | Kaplan et al. |
| 7,839,302 B2 | 11/2010 | Staniszewski |
| 7,840,427 B2 | 11/2010 | O'Sullivan |
| 7,855,935 B1 | 12/2010 | Lauder et al. |
| 7,893,847 B2 | 2/2011 | Shanbhag et al. |
| 7,900,966 B1 | 3/2011 | Stennett |
| 7,949,464 B2 | 5/2011 | Kaplan et al. |
| 7,956,769 B1 | 6/2011 | Pearl |
| 7,966,215 B1 | 6/2011 | Myers et al. |
| 8,111,172 B2 | 2/2012 | Morimoto et al. |
| 8,175,803 B2 | 5/2012 | Caraballo |
| 8,244,566 B1 | 8/2012 | Coley et al. |
| 8,600,800 B2 | 12/2013 | Rowe et al. |
| 8,620,768 B1 | 12/2013 | Lopez et al. |
| 8,688,509 B2 | 4/2014 | Rowe et al. |
| 9,511,677 B1 * | 12/2016 | Brooks .................... H02J 3/008 |
| 2002/0077953 A1 | 6/2002 | Dutta |
| 2002/0099574 A1 | 7/2002 | Cahill et al. |
| 2003/0055727 A1 | 3/2003 | Walker et al. |
| 2004/0068433 A1 | 4/2004 | Chatterjee et al. |
| 2004/0236615 A1 | 11/2004 | Msndy |
| 2004/0254840 A1 | 12/2004 | Slemmer et al. |
| 2005/0280555 A1 | 12/2005 | Warner, VI |
| 2006/0068704 A1 | 3/2006 | Bhakta et al. |
| 2006/0152349 A1 * | 7/2006 | Ratnakar .................... 340/426.1 |
| 2006/0247848 A1 | 11/2006 | Cheng |
| 2006/0259353 A1 | 11/2006 | Gutmann |
| 2007/0008181 A1 | 1/2007 | Rollert et al. |
| 2007/0050240 A1 | 3/2007 | Belani et al. |
| 2007/0136128 A1 | 6/2007 | Janacek et al. |
| 2007/0290888 A1 | 12/2007 | Reif et al. |
| 2008/0133425 A1 | 6/2008 | Grush |
| 2008/0136674 A1 | 6/2008 | Jang et al. |
| 2008/0208680 A1 | 8/2008 | Cho |
| 2009/0125341 A1 | 5/2009 | Somoza et al. |
| 2009/0164635 A1 | 6/2009 | Denker et al. |
| 2009/0171567 A1 | 7/2009 | Morimoto et al. |
| 2009/0276236 A1 | 11/2009 | Adamczyk et al. |
| 2009/0309760 A1 | 12/2009 | Chew |
| 2010/0030708 A1 | 2/2010 | Ward, II |
| 2010/0106514 A1 | 4/2010 | Cox |
| 2010/0190510 A1 | 7/2010 | Maranhas et al. |
| 2010/0198423 A1 * | 8/2010 | Hirst ...................... G01D 4/004 700/292 |
| 2010/0328104 A1 | 12/2010 | Groft |
| 2011/0035261 A1 | 2/2011 | Handler |
| 2011/0068739 A1 | 3/2011 | Smith |
| 2011/0093352 A1 | 4/2011 | Sarmiento et al. |
| 2011/0109276 A1 * | 5/2011 | Bohme ............... B60L 11/1809 320/155 |
| 2011/0127944 A1 | 6/2011 | Saito et al. |
| 2011/0131083 A1 | 6/2011 | Redmann et al. |
| 2011/0140658 A1 | 6/2011 | Outwater et al. |
| 2011/0181441 A1 | 7/2011 | Ma et al. |
| 2011/0193522 A1 | 8/2011 | Uesugi |
| 2011/0213656 A1 * | 9/2011 | Turner ..................... B60L 3/12 705/14.49 |
| 2011/0227533 A1 | 9/2011 | Wolfien |
| 2011/0241619 A1 | 10/2011 | Young et al. |
| 2011/0246252 A1 | 10/2011 | Uesugi |
| 2011/0257881 A1 | 10/2011 | Chen et al. |
| 2012/0044091 A1 | 2/2012 | Kim et al. |
| 2012/0053998 A1 | 3/2012 | Redman |
| 2012/0062394 A1 | 3/2012 | Pampus et al. |
| 2012/0112698 A1 | 5/2012 | Yoshimura et al. |
| 2012/0173292 A1 | 7/2012 | Solomon et al. |
| 2012/0188101 A1 | 7/2012 | Ganot |
| 2012/0200430 A1 | 8/2012 | Spahl |
| 2012/0245981 A1 | 9/2012 | Volz |
| 2012/0259723 A1 * | 10/2012 | Ansari et al. ................ 705/26.3 |
| 2012/0323643 A1 | 12/2012 | Volz |
| 2012/0326893 A1 | 12/2012 | Glezerman |
| 2013/0073350 A1 | 3/2013 | Blustein |
| 2013/0076296 A1 | 3/2013 | Ushiroda |
| 2013/0144660 A1 | 6/2013 | Martin |
| 2013/0166530 A1 | 6/2013 | Pilat et al. |
| 2013/0332509 A1 | 12/2013 | Schwartz et al. |

FOREIGN PATENT DOCUMENTS

| | | |
|---|---|---|
| JP | 08022598 | 1/1996 |
| WO | 0046068 | 8/2000 |

(56) References Cited

FOREIGN PATENT DOCUMENTS

| WO | 2004084145 | 9/2004 |
| WO | 2006086831 | 8/2006 |
| WO | 2011002583 | 1/2011 |

OTHER PUBLICATIONS

Weinberger et al., US Parking Policies: An Overview of Management Strategies, Institute for Transportation & Development Policy, http://www.streetsblog.org/wp-content/pdf/ITDP_Parking_FullReport.pdf, Feb. 2010, retrieved Jun. 7, 2013.

Geroliminis et al., "A review of green logistics schemes used in cities around the world", UC Berkeley Center of Future Urban transport: A volvo center of excellence, http://escholarship.org/uc/item/4x89p485.pdf, Aug. 1, 2005, retrieved Jun. 19, 2013.

* cited by examiner

COMPUTER-IMPLEMENTED SYSTEM AND METHOD FOR MANAGING INTERCHANGEABLE EV CHARGING-CAPABLE PARKING SPACES

FIELD

This application relates in general to motor vehicle parking control and management and, in particular, to a computer-implemented system and method for managing interchangeable EV charging-capable parking spaces.

BACKGROUND

Until recently, the internal combustion engine, whether powered by gasoline, diesel or some other form of fossil fuel, has been a ubiquitous part of nearly every modern automobile. The near-universal use of the internal combustion engine has fed an unrelenting reliance on fossil fuels and contributed to pollution and global warming. Over the last two decades, increasing fuel prices, a shared desire to conserve scarce natural resources and government mandates for higher-efficiency vehicles have stimulated the development of automobiles that either combine an internal combustion engine with electric power in a hybrid drivetrain, or which use electricity as the sole power source. Gasoline-electric hybrid vehicles still retain an internal combustion engine to provide motive power, electricity-generative power or both. An increasing minority of these vehicles now provide a "plug-in" feature that allows onboard batteries to be charged from an external electric charging station, which can effectively render gasoline power optional, provided the onboard batteries retain a sufficient charge. Fully electric vehicles are wholly dependent on external charging, an aspect that can also lead to a worry in drivers of these vehicles, known as "range anxiety," that their electric vehicle lacks sufficient driving range and could potentially leave the driver stranded without battery power or a means for replenishing that battery power.

Both plug-in hybrids and fully electric vehicles belong to the group of electric vehicles ("EVs") that are dependent, to some degree or entirely, on external electric charging facilities. While service stations that dispense gasoline and diesel fuel are plentiful, the infrastructure for charging (or "refueling") EVs remains only sparsely implemented, which feeds into the fears of range anxiety. Moreover, charging an EV generally takes a significantly longer amount of time than needed to fill a tank of gasoline and, as a result, EV drivers must contend with the few available charging stations being tied up for longer periods of time. While the rate at which an EV's battery is charged can be increased, the shorter charging times are at the cost of battery life, which is often shortened by the process of rapid charging. Consequently, EV drivers have to adopt driving habits and charging routines that account for these shortcomings.

Efficient utilization and sharing of EV charging stations is paramount to ensuring the success of EVs. While private charging stations can be installed at home, these devices are often costly and can require significant electrical upgrade. On the other hand, publicly-usable EV charging stations have increasingly become available as an adjunct to parking facilities, as an EV will effectively remain parked for whatever time is necessary to charge the onboard batteries. The need to park an EV for whatever time is necessary to charge the onboard batteries is in contrast to the transitory nature of refueling with gasoline or diesel at a service station, where vehicles frequently come and go. For that reason, parking lot operators, storeowners, restaurateurs, inn keepers, and other interests catering to or reliant upon business from motorists who need to park their vehicles see the provisioning of charging stations as a way to incentivize customers to patronize their establishments. However, the first-come, first-served usage model is inadequate to ensuring charging station availability for EV drivers. Moreover, for these individuals who own or provide charging stations to maximally benefit from this resource, an array of charging stations must be managed in a way that maximizes their profitable usage, yet is easy for EV drivers, and has enforceable restrictions that prevent abuse. Conventional EV charging station solutions fail to sufficiently address these concerns.

For instance, U.S. Pat. No. 4,532,418 to Meese et al. discloses a structure for and method of charging an electric vehicle at a parking location and facilitating billing for the charging energy utilized and the parking time. The structure includes a standalone charging and parking meter at a parking space for receiving a charge card and into which a charging plug from an electric vehicle may be placed, along with structure for reading the charge card and locking the plug in place. A central processor unit tracks charging energy used and parking time and stores billing data for periodic removal to facilitate billing.

U.S. Pat. No. 6,081,205 to Williams discloses an electronic parking meter and electric automobile recharging station. An input device enables a user to select the parking time or recharging time for the electric vehicle after entering recharge power requirements. A payment receptor receives payment for the parking and recharge time. The recharging station and parking space are managed as a discretely-purchasable resource.

U.S. Patent Publication No. 2011/0227533 to Wolfien discloses a car parking system for charging motor vehicles with electrical energy. A charging station associated with a parking space is capable of being coupled electrically to a motor vehicle to charge a charge storage unit (battery). The car parking system has a central processing unit that is separate from but which communicates with the charging station for retrieving characteristics of the motor vehicle. A user can buy time to park and charge the motor vehicle and can choose slow or fast charging, but the charging station and parking space are managed as a discretely-purchasable resource.

U.S. Patent Publication No. 20120173292 to Solomon et al. discloses reservable electric vehicle charging groups within an electric vehicle charging network. An electric vehicle charging network server is coupled with multiple electric vehicle charging stations that each include one or more charging ports and are owned by a charging station host. When configured, an electric vehicle charging reservation group includes multiple charging ports and allows a limited number of electric vehicle charging group reservations that are each applicable to all charging ports in the reservation group, yet parking is not separately reservable by non-electric vehicles or vehicles who do not belong to a reservation group.

U.S. Patent Publication No. 2011/0246252 to Uesugi discloses a vehicle charging allocation managing server and vehicle charging allocation managing system that contains plural charging stations. Each charging station has a battery charger to charge a vehicle, a charging station managing server for managing the charging stations, and a vehicle charging allocation managing server that allocates each of the vehicles to an appropriate one of the charging stations for charging. The vehicle charging allocation managing server has a controller for setting a vehicle charging allocation schedule and a charting time zone to charge each of the vehicles on the basis of a battery residual capacity and a battery capacity consumption plan.

U.S. Patent Publication No. 2011/0035261 to Handler discloses charging vehicles in a parking area. A charge request may be received for a vehicle located in the parking area and having a power connection with a power source. An electric charge is provided through the power connection to the vehicle based upon receiving the charge request and payment is recorded upon departure of the vehicle from the parking area.

U.S. Patent Publication No. 2011/0127944 to Saito et al. discloses a parking and power charging system. The parking and power charging system attempts to optimize charging performance of a fleet based on the state of charge of each electric vehicle's battery. When an electric vehicle arrives at a car park, a parking state detection means detects the presence of empty parking spaces. The charging performance to each detected empty parking space is ranked, so that the empty parking space having higher ranking of charging performance is selected based on the electric vehicle's state of charge.

U.S. Patent Publication No. 2011/0131083 to Redmann et al. discloses a method and apparatus for parking lot management that associates a parking lot parking entry event and a parking lot electric vehicle charging event, which allows a single payment to be calculated for parking and electric vehicle charging.

U.S. Patent Publication No. 2011/0140658 to Outwater et al. discloses an automated parking garage with electric vehicle charging. A carriage receptacle is physically attached to a carriage of a high-density parking system. The carriage receptacle electrically connects to an electric vehicle supported by the carriage. A bay receptacle is physically attached to a bay of the high-density parking system, which in turn electrically connects the carriage receptacle to a power source to provide charging to the electric vehicle when the carriage is moved into the bay.

U.S. Patent Publication No. 2011/0241619 to Young et al. discloses a distributed charging system for charging an energy storage device of an electrical vehicle operated within an operation region, where a number of station or parking areas are arranged at intervals. The system contains a plurality of charging stations and fast charging devices. When the electrical vehicle is parked at a station or parking area, the electrical vehicle's energy storage device is quickly charged by the fast charging device.

U.S. Patent Publication No. 2011/0193522 to Uesugi discloses an operation managing server for charging stations, each of which has a charger and accepts a charging request for charging a vehicle battery. A charging time estimating unit estimates a charging time required to charge the vehicle battery based on past charger data. The system learns a battery's charging times to provide a better estimate of charging time. The user can choose a free charging station or allow the server to recommend one based on time or proximity.

U.S. Patent Publication No. 2012/0112698 to Yoshimura et al. discloses a charging system that includes a parked car number detecting unit configured to determine the priority by which one of two vehicle groups is preferentially charged according to the number of parked cars or the parking rate.

There is a need for providing efficacious utilization of EV charging infrastructure that balances both charging capacity and parking by EV and non-EVs alike.

SUMMARY

A centralized server-based system and method for managing and reserving parking spaces capable of charging an EV, that is, a plug-in hybrid or fully electric vehicle, treats sets of parking spaces as interchangeable pooled resources. A motorist of an EV can book a parking reservation with charging of the EV by specifying parking in a desired location. Parking spaces serve dual uses for parking alone or parking with charging. The parking spaces are handled as a common parking pool, such as the parking spaces on one side of a city block, and each parking space has equal access to a charging station. The server determines charging capacity availability within a parking time window and the motorist can choose a parking time up to or beyond, if permitted, the maximum charging time needed to charge the EV. Motorists of non-EVs can similarly reserve parking within a parking pool with the server ensuring optimal use of charging capacity and parking spaces.

One embodiment provides a computer-implemented system and method for managing interchangeable EV charging-capable parking spaces. A parking pool that includes a plurality of parking spaces and at least one charging station with one or more charging ports is formed. All of the parking spaces in the parking pool have equal access to the at least one charging station. Each parking space is interchangeably reservable by motorists. The at least one charging station includes an aggregate charging capacity that is less than or equal to a total number of the charging ports. A request from a motorist with an EV for parking with charging is received. The request includes a desired duration to park in the parking pool and a start time. The parking spaces in the parking pool that are currently-occupied by other vehicles and any reservations by other motorists to park their vehicles in the parking pool concurrent to the current time for the desired duration are identified. A number of the parking spaces in the parking pool that are available at the current time free of the currently-occupied parking spaces and the parking spaces in the parking pool that will be used to fulfill the reservations are determined. Time available to park in the parking pool through the desired duration free of the currently-occupied parking spaces and the parking spaces in the parking pool that will be used to fulfill the reservations is determined. Availability of charging capacity in the parking spaces in the parking pool that are currently-occupied by other vehicles and any reservations by other motorists to park and charge their vehicles in the parking pool concurrent to the current time for the desired duration is determined. A reservation for the motorist is created, contingent on the availability of the charging capacity allowing charging of the EV from the start time through the desired duration, provided that the number of available parking spaces in the parking pool and the time available are sufficient to satisfy the desired duration of the request beginning at the current time.

The foregoing system and method provides several advantages over conventional approaches to EV charging infrastructure management. First, by aggregating reservations across interchangeable dual use parking spaces, short time gaps in parking space usage can be consolidated, which reduces fragmentation and can raise the overall level of parking space occupancy. Interchangeable dual use parking reservations require less equipment, as one parking meter per parking space is no longer necessary. As well, offering charging to EVs through a pooled parking approach better utilizes a scarce resource subject to unpredictable demand. EV drivers gain predictability in access to charging facilities, which encourages use of their vehicles and can contribute to lowering fossil fuel dependency and pollution. Finally, interleaving parking and charging through a shared infrastructure maximizes resource utilization, as each parking space serves dual uses that over time result in an overall usage level better than would be obtained by dedicated parking or charging alone.

In addition, managing parking and EV-charging allows the drivers of EVs to charge their EV at the same time that they are doing some other activity that typically entails parking, like working, shopping, traveling, playing, and so on. Moreover, dual use parking spaces, that is, parking spaces that are capable of charging an EV and usable for parking, do not sit idle, as an unused resource, when there is no demand for charging yet there is demand for parking.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Parking Services Infrastructure

Figure 1:
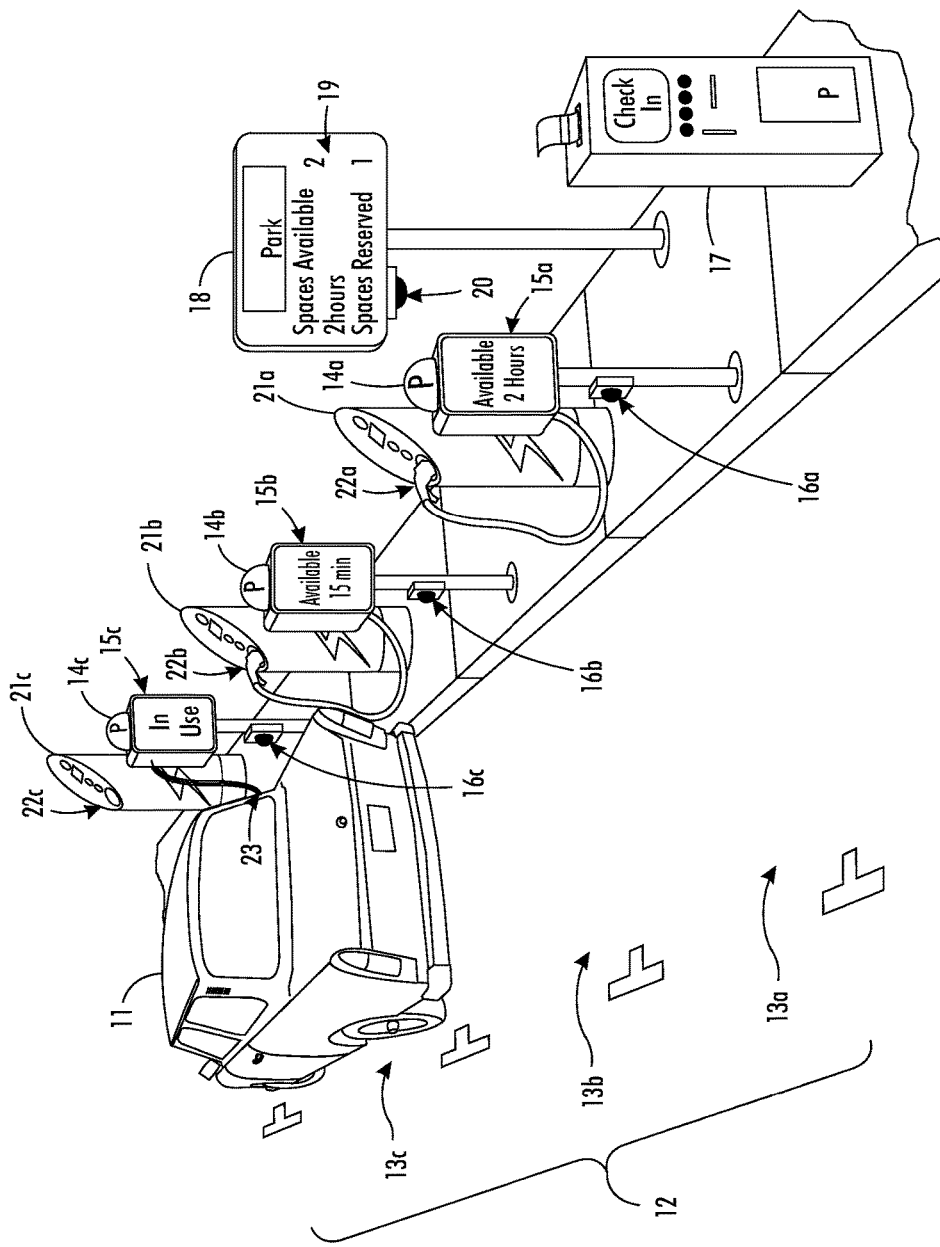
FIG. 1 is a diagram showing a computer-implemented system for managing interchangeable EV charging-capable parking spaces in accordance with one embodiment.

In addition to having to park their vehicles when out and about, drivers of electrically-chargeable vehicles (hereafter, simply "EVs"), such as plug-in hybrid and electric vehicles, also need to periodically recharge their vehicles, in contrast to the parking-only needs of non-EV drivers. Motorists, urban residents, local businesses, and other parties that need to park somewhere are all able to reserve and use EV charging-capable parking through centrally-managed parking spaces. The centralized servicing of the EV charging-capable parking spaces efficaciously facilitates mixed EV and non-EV parking utilization. FIG. 1 is a diagram showing a computer-implemented system 10 for managing interchangeable EV charging-capable parking spaces in accordance with one embodiment. Individual parking spaces 13a-c, each of which are capable of charging an EV 11, are formed into a parking pool 12 and can be designated for dual use, which includes charging and parking usage by an EV 11 or parking-only usage by any vehicle, whether an EV or non-EV. The parking spaces 13a-c are managed as a common pool, whether the individual parking spaces 13a-c are physically adjacent to each other or disbursed.

A motorist can reserve space for parking in a parking pool 12 ahead of time or on-site as a form of "instant" parking reservation. The same considerations apply if a motorist already parked in one of the parking spaces 13a-c within a parking pool 12 wants to extend the parking time. In a further embodiment, the parking spaces 13a-c are formed into a generic parking pool 12 for all types of vehicles in which a motorist can reserve parking, such as described in commonly-assigned U.S. patent application, entitled, "Computer-Implemented System And Method For Managing Interchangeable Parking Spaces," Ser. No. 13/624,876, filed Sep. 21, 2012, pending, the disclosure of which is incorporated by reference. In a still further embodiment, the parking spaces 13a-c can be designated for mixed use, which includes concurrent loading zone and public parking, such as described in commonly-assigned U.S. patent application, entitled, "Computer-Implemented System And Method For Providing Just-In-Time Loading Zone Parking," Ser. No. 13/624,873, filed Sep. 21, 2012, pending, the disclosure of which is incorporated by reference. For simplicity, parking, whether controlled by local government or privately owned, and regardless of whether curbside, on a driveway, in cutouts in front of a driveway ("curbcuts"), within a parking lot, or in other physical locations will henceforth be called simply "parking."

Parking within pools 12 of interchangeably reservable EV charging-capable parking spaces 13a-c, whether for charging and parking by an EV 11 or for parking only by any vehicle, whether an EV or non-EV, can be requested ahead of time by a motorist through centralized parking services or on-site using a parking meter or appliance or, in a further embodiment, a virtual overlay communications device, such as a GPS device, a smart phone, a regular phone with an automated menu, augmented reality glasses, an audio player, or other similar devices. Parking can be managed to allow only EVs to charge and park, to allow any vehicle, whether an EV or non-EV, to park in any parking space 13a-c at any time, or to only allow specific kinds of vehicles to park at certain times. The system can be configured to allow only parking reserved in advance, or to also accommodate on-the-spot parking. When offered, conventional first-come, first-served on-street parking may be subject to applicable parking restrictions and prohibitions and local restrictions. First-come, first-served on-street parking is also limited by any pending parking reservations for the parking spaces 13a-c in the parking pool 12 affected where the on-street parking is desired. Additionally, the applicable parking restrictions and prohibitions, local restrictions and price may automatically change, based on fixed rules by time of day, or could be revised dynamically based on parking or charging demand, electricity market price or on some other metric, provided that such dynamic adjustments will not affect reservations made in advance. For example, the parking services 33 could restrict mid-day parking to EVs only to take advantage of higher charging demand and allow any vehicle, whether an EV or non-EV, to park (and charge, if desired) in the morning and evening, when charging demand is lower. The system could automatically set the parking restrictions based on demand, as reflected, for instance, by requests for parking reservations, or by past usage patterns.

Parking support equipment, as variously configured and further described infra, provide the functions needed to reserve and manage dual use parking. In one embodiment, each parking space 13a-c has an assigned single-space parking meter 14a-c, each of which respectively includes dynamic signage 15a-c for indicating parking and charging availability, such as "Reserved," "Paid" and "Short Term Parking Only," and a vehicle occupancy sensor 16a-c, such as a video or still camera, for detecting vehicle occupancy in the assigned parking space 13a-c. In a further embodiment, dynamically-updated signage 18 located adjacent or near to the parking spaces 13a-c advises motorists of on-street parking and charging availability and duration 19, plus whether any current pending reservations may affect any unoccupied parking spaces 13b-c. If the charging stations 21a-c assigned to a parking pool 12 associated with the signage 18 have an aggregate charging capacity that is less than what is needed to simultaneously power the total number of ports 22a-c, as further described infra, the signage 18 would indicate (limited) charging and parking availability. The parking advisory displayed by the signage 18 could apply locally to just those parking spaces 13a-c to which the signage is near, to one city block face, to an entire city block, or any other area of parking interest. Ideally, the signage 18 displays the parking advisory large enough to allow motorists to read the information necessary to making a decision on parking without getting out of their vehicles. A vehicle occupancy sensor 24, such as a video or still camera, collectively measures occupancy of all of the parking spaces 13a-c. In a further embodiment, the parking services 33 can notify parking enforcement authorities when a motorist has parked in a parking space 13a-c without a reservation, payment or other form of authorization, such as a disabled parking permit. In a still further embodiment, the parking services can physically block or permit access to the parking spaces 13a-c by deploying motorized posts (bollards) (not shown) that rise or drop below street level under system control, thereby serving the dual purposes of physically blocking reserved parking spaces and visually reinforcing that parking is not presently permitted.

On-site, motorists can interact with the centralized parking services that handle the parking spaces 13a-c assigned to the parking pool 12 through each parking meter 15a-c or via a centralized parking kiosk 17, as well as through a parking appliance (not shown), which includes the motorist contacting the parking services and the parking services contacting the motorist, either personally or through a broadcast message, as permitted by the motorist. Off-site, such as from a vehicle that is en route, motorists can interact with the centralized parking services through a virtual overlay communications device, such as a GPS device, a mobile phone, or other similar onboard or vehicle-mounted devices. In addition, when a motorist has a virtual overlay communications device and provides contact information, the parking service 33 could initiate communication with a motorist to provide an update on a waitlisted parking reservation request or other type of authorized parking status. Still other devices with which to interact with the parking services are possible.

Each of the parking spaces 13a-c in the parking pool 12 has equal access to a charging station 21a-c, which is hardware that provides electrical charging to an EV 11. Each charging station 21a-c has one or more ports 22a-c, which are electrical connections 23 for interfacing an EV 11 with a charging station 21a-c. The charging stations 21a-c assigned to the parking spaces 13a-c in a parking pool 12 have sufficient ports 22a-c to provide equal access to charging to all of the parking spaces 13a-c. However, an individual charging station could lack the capacity to actively drive a charging current through all of the ports 22a-c on that charging station at the same time. In that configuration, EVs could be plugged into the charging station, but would not be actively charging until charging capacity becomes available, for instance, upon the departure of another EV 11 plugged into that charging station or when another EV 11 completes charging, yet remains parked. In this case of limited charging capacity, a motorist can park and plug in an EV 11, even if charging does not begin immediately, with no need to return to the EV 11 to turn a charging system on, or off, in the middle of a reservation for parking with charging. In addition, the ports 22a-c may be configurable to charge an EV 11 at different rates, where a high-powered port will charge in EV 11 in less time than a low-power port. Further, a single charging station 21a-c could physically include more charging ports 22a-c than the charging station 21a-c could simultaneously electrically support in terms of charging capacity, which allows the parking services 33 to appropriately size the charging station hardware for typical EV charging demand instead of for maximum demand. The ports 22a-c can be physically interfaced to an EV 11 through a cable that could be stored when not in use, for example, below ground, above ground hanging from the charging station 22a-c or an overhead rack, or in a container above ground. Other forms of cabled charging are possible.

In a further embodiment, the ports 22a-c could use a form of cable-less inductive charging that do not require wired electrical connections for plugging an EV 11 into a charging station 21a-c. Inductive charging allows charging to commence without first requiring that a physical cable-type electrical connection 23 be made into an available port 22a-c (or worrying about handling dirty or tangled electrical cords), and an EV 11 only needs to park over the inductive charging pad to charge or be located in a position relative to the inductive charging pad to be charged, as appropriate to the type of inductive charging pad used. Inductive charging pads are embedded under the surface of a parking space 13a-c, or other suitable location, and a vehicle occupancy sensor 16a-c, 20 senses that a vehicle has parked. Other forms of cable-free charging are possible.

The management of the charging of an EV 11 may be performed autonomously using onboard hardware in each EV 11, which would only require an electrical connection 23 to each port 22a-c, or by the charging station 21a-c, provided that the charging station 21a-c is properly outfitted with charging software appropriate to each type of EV 11. The charging of an EV 11 can begin immediately upon being physically connected to a charging station 21a-c or, in a further embodiment, upon positioning the EV 11 over an inductive charging pad or be located in a position relative to the inductive charging pad to be charged, as appropriate to the type of inductive charging pad used. Alternatively, charging could be configured to commence only after the driver presses a control in the EV 11 or on the charging station 21a-c, which provides a physical confirmation from the driver that charging is desired, the cost for which is then knowingly incurred. If the parking time exceeds the time needed to charge the EV, the actual delivery of electricity to the EV 11 from the charging station 21a-c need not happen immediately and could be deferred or scheduled to be delivered at some point during the charging and parking reservation. In a further embodiment, the charging station 21a-c could proactively ask a driver if charging is desired when the charging station 21a-c senses that the EV 11 needs charging.

Components

Parking management and reservation services ("parking services") are adaptable to operating on different configurations of parking support equipment including configurations for managing multiple parking spaces (multi-metered parking), single parking spaces (single-metered parking), multiple parking spaces through a short tether arrangement (short-tethered parking), and mixed uses, such as concurrent loading zone and short-term parking, such as described in U.S. patent application, entitled, "Computer-Implemented System And Method For Managing Interchangeable Parking Spaces," Ser. No. 13/624,876, and U.S. patent application, entitled, "Computer-Implemented System And Method For Providing Just-In-Time Loading Zone Parking," Ser. No. 13/624,873, cited supra. By configuring the equipment, the parking spaces 13a-c can be designated for dual use, which includes charging and parking usage by an EV 11 or parking-only usage by any vehicle, whether an EV or non-EV, at any time or with restrictions on kinds of vehicles or parking times. Installations could combine different configurations for different areas of a city or municipality, or for different owners or operators of the charging stations. Still other configurations are possible.

Each configuration of parking support equipment provides the following functions:
1) Indicating whether charging is available (permitted) within a parking pool of parking spaces and for how long.
2) Indicating whether parking is available (permitted) within a parking pool of parking spaces and for how long.
3) Indicating whether there are current pending parking with charging or parking-only reservations for any unoccupied parking spaces.
4) Sensing and logging the occupancy state of parking spaces for parking with charging or parking-only.
5) Supporting user interactions with the parking services.

Other functions, including functions needed to provide legacy support for traditional individually-reservable parking, as well as showing current and future price for parking with charging or parking only, are possible.

Figure 2:
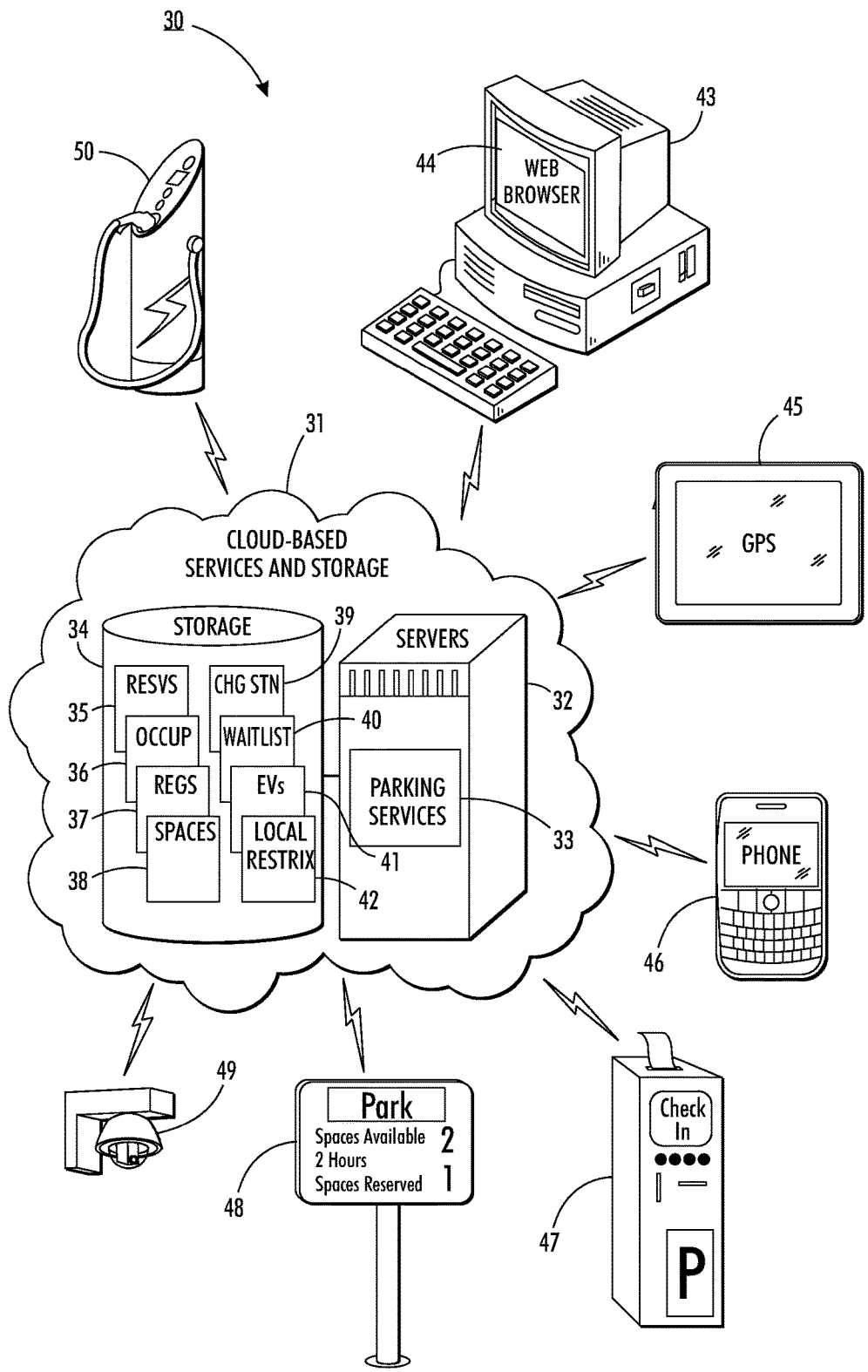
FIG. 2 is a functional block diagram showing the components of the system of FIG. 1.

The parking services are provided through a centrally-managed hub from which a range of different types of components provide vehicle occupancy inputs and user outputs for creating charging and parking and parking-only reservations and displaying parking status. FIG. 2 is a functional block diagram showing the components 30 of the system 10 of FIG. 1. The parking services 33 rely upon identifying which motorists or vehicles are arriving, occupying and departing, which enables the parking services 33 to account for charges properly upon vehicle departure or, if charging, for the costs of charging while parked. In one embodiment, a motorist checks-in to a particular parking space 13a-c ("pay-by-space") when parking and vehicle occupancy sensors identify when the vehicle 11 leaves the parking space 13a-c. In a further embodiment, parking reservations are assigned by location and a motorist checks-in to a parking pool 12 of parking spaces 13a-c ("pay-by-pool" or "pay-by-location") and vehicle occupancy sensors identify when the vehicle 11 leaves from the parking space 13a-c within the parking pool 12.

The parking services are provided through centrally-operated parking servers 32 that can be remotely accessed by users over a wide area public data communications network, such as the Internet, using wired or wireless connections. The parking services 33 are server-based and implemented on the parking servers 32, which may be provided through cloud-based services 31 or by dedicated servers (not shown). Similarly, storage of parking data may also be provided through cloud-based storage 34 or by dedicated storage (not shown). The parking servers 32 communicate with governmental transportation department officials or their equivalent for setting parking policies, enforcing parking regulations, prohibitions and, if applicable, local restrictions and monitoring system performance. In addition, the parking servers 32 can communicate with drivers, city residents, merchants, parking enforcement officers, and other stakeholders for the various types of parking services provided.

These users can communicate with and provide payment to the parking services 33 through various types of devices, depending upon the location of the user, the context of the communications and, if applicable, form of payment. To request parking with charging or parking-only reservations or to interact with parking services 33, users can access the parking servers 32 through, for instance, a personal or tablet computer 43 using a Web browser or similar application 44, a GPS device 45 with a parking application, a parking application on a wireless mobile device 46, such as a smart phone or similar wireless-capable and Web-enabled device, and a parking meter or appliance 47 located at curbside or near to the parking spaces 13a-c, for instance, on a sidewalk. Payment in currency can be collected at curbside by the parking meter or appliance 47 and payment, including preauthorizations for parking, using an electronic form of payment, such as a credit or debit card, can be collected at curbside or remotely by the parking services 33. Other types of fixed or mobile user communication devices are possible.

The parking servers 32 maintain lists or databases of parking data, which may be changed by the parking services 33 as needed. The parking data includes a set of parking reservations ("Resys") 35 for parking with charging and parking-only at future times or on-the-spot "instant" parking; parking space occupancy data ("Occup") 36 indicating which parking spaces are currently occupied by a vehicle; a set of parking time regulations ("Regs") 37 that typically apply to all of the parking spaces, including the amount of time allowed for charging and for parking without charging; a list or database of the interchangeable parking spaces and charging stations in each of the parking pools ("Spaces") 38; information about the electrical capabilities of the charging stations ("Chg Stn") 39; a waitlist of parking with charging and parking-only reservation requests ("Waitlist") 40 that have not yet been fulfilled or requests to extend the time on an existing parking reservation and contact information for drivers to notify them of reservation status, waitlist status, charging status, changing fee structures, or other relevant information, as appropriate to the type of parking reservation desired; a library of information about EV models and their batteries ("EVs") 41 for use in estimating the time needed to charge the battery in a particular model of EV; and a list of local restrictions ("Local Restrix") 42 on parking and contact information for local enforcement officers. Other parking data may also be stored for use by parking services 33.

The status of parking within a parking pool 12 is provided through dynamic signage 48 that is also located at curbside or nearby. The dynamic signage 48 can be a single sign or separate signs associated with individual parking spaces 13a-c, such as provided on a parking meter or appliance. Other types of dynamic signage are possible.

The parking services 33 tracks the occupancy state of parking spaces 13a-c, both individually and as part of a parking pool 12, through vehicle occupancy sensors 49, such as video or still cameras, magnetic sensors, or ultrasonic sensors, located at curbside or nearby. Each sensor 49 determines whether one or more parking spaces 13a-c is currently occupied by a vehicle 11 or is available for parking. One sensor 49 can be assigned to each parking space 13a-c or a single sensor 49 can be deployed to monitor several parking spaces 13a-c, such as the parking spaces 13a-c within a parking pool 12. Other types of sensors are possible.

Each of the parking spaces 13a-c in the parking pool 12 has equal access to a charging station 21a-c, as every parking space 13a-c is capable of providing charging and parking or parking only. The charging stations 21a-c can be distributed with one charging station 21a-c assigned to each individual parking space 13a-c. Alternatively, charging station access can be provided communally through a charging station hub (not shown) that is capable of charging a plurality of EVs and which can be equipped to accommodate EVs with different charging connector requirements. Other types of charging stations are possible.

In further embodiments, the foregoing components can be supplemented by additional functionality to enhance system usability. For instance, the parking services 33 could notify the driver of an EV 11, for example, by phone call, text message, email, or via display at a charging station 21a-c, when charging starts, that the EV 11 has been charged, of the estimated charge time after the EV 11 is plugged-in (or, in a further embodiment, parked over an inductive charging pad), when a parking with charging or parking-only reservation has expired or is close to ending, or when a waitlisted reservation 40 becomes available or the option to extend a parking with charging reservation is available. Estimated charge time could be determined by an assessment of the state-of-charge of an EV's battery, which could be assessed by a measurement made by the charging station 21a-c or from driver input of battery type and any vehicle indication of charge level. Other types of system usability enhancements are possible.

In still further embodiments, the foregoing components can also be supplemented by additional functionality to enhance utilization of a scarce resource. Pricing could be structured to discourage charging capacity waste and abuse. For example, the pricing structure for charging an EV 11 could be based on the amount of electricity used, the amount of time that the charging station 21a-c is in-use, or on a per-use flat fee basis. The pricing structure could also offer fast or slow charging from the same charging station 21a-c with different rates for each. Price could be, for instance, structured to incent faster charging or short stays using a price per unit of electricity used or a price per unit time that increases over time. As well, the parking services 33 may want to assess higher fees for fast charging, as the hardware must handle higher electrical current outflow and therefore costs more than the hardware for a slow charger or, alternatively, lower fees for fast charging, as faster charging potentially shortens the life of an EV's battery. Finally, a motorist could sell electricity back to the parking services 33 by allowing a charging station 21a-c to draw electric power from an EV 11 and thereby contribute back to the power grid, albeit for compensation or credits.

Pricing could also be designed to create higher turnover of the charging station 21a-c and the parking spaces 13a-c. The parking services 33 could charge a premium fee for parking beyond the time needed to charge an EV 11, impose extra fees or penalties if a vehicle is not moved within a set time window after the end of a reservation, or refund fees to a driver who vacates a parking space 13a-c before a parking with charging or parking-only reservation has ended. On the other hand, the parking services 33 could require prepayment on a parking with charging or parking-only reservation to discourage unused reservations, while concomitantly providing the ability of one driver to buy out another driver's reservation. Thus, if a driver is in dire need of a charge and there are no charging stations free of parking with charging reservations, the driver could offer to pay a premium fee if another driver is willing to leave early or abandon a parking with charging reservation, for which the second driver will be compensated. The system would notify all drivers that are currently charging or holding a reservation that someone wants to buy out their parking with charging reservation. Those drivers could then choose whether to accept the offer and vacate the spot or the reservation. Finally, the parking services 33 could place a limit on the total number of reservations, whether parking with charging or parking only, that one driver can make in a given period of time to prevent abuse of the reservations system and preclude illicit financial gain by booking more time than needed, with exceptions to the limit granted to delivery drivers or other motorists who have a bona fide need to park frequently. This limit can be enforced using the driver's name, credit card, vehicle identifying information, such as license plate, or other identifying information. Other types of scarce resource utilization enhancements are possible.

Parking Services Methodology

The reserving and use of a pool 12 of parking spaces 13a-c and charging stations 21a-c that can be used for both parking any vehicle, whether an EV or non-EV, and for both parking with charging EVs is aimed at maximizing the utilization of both the parking spaces 13a-c and charging stations 21a-c, while providing a service that makes owning and driving an EV easier. The system provides two shared services, parking with charging, and the approach to managing these services is significantly different from the approach used in managing stations that are used only for parking or only for charging. Here, all the parking spaces 13a-c for parking with charging are treated as interchangeable within a parking pool 12 and the parking service 33 can choose to make some or all of parking spaces 13a-c in the parking pool 12 open to reservation. The operator can also choose to limit the number of parking spaces 13a-c used for parking with charging or for parking only.

Dual Use Parking Methodology

Figure 3:
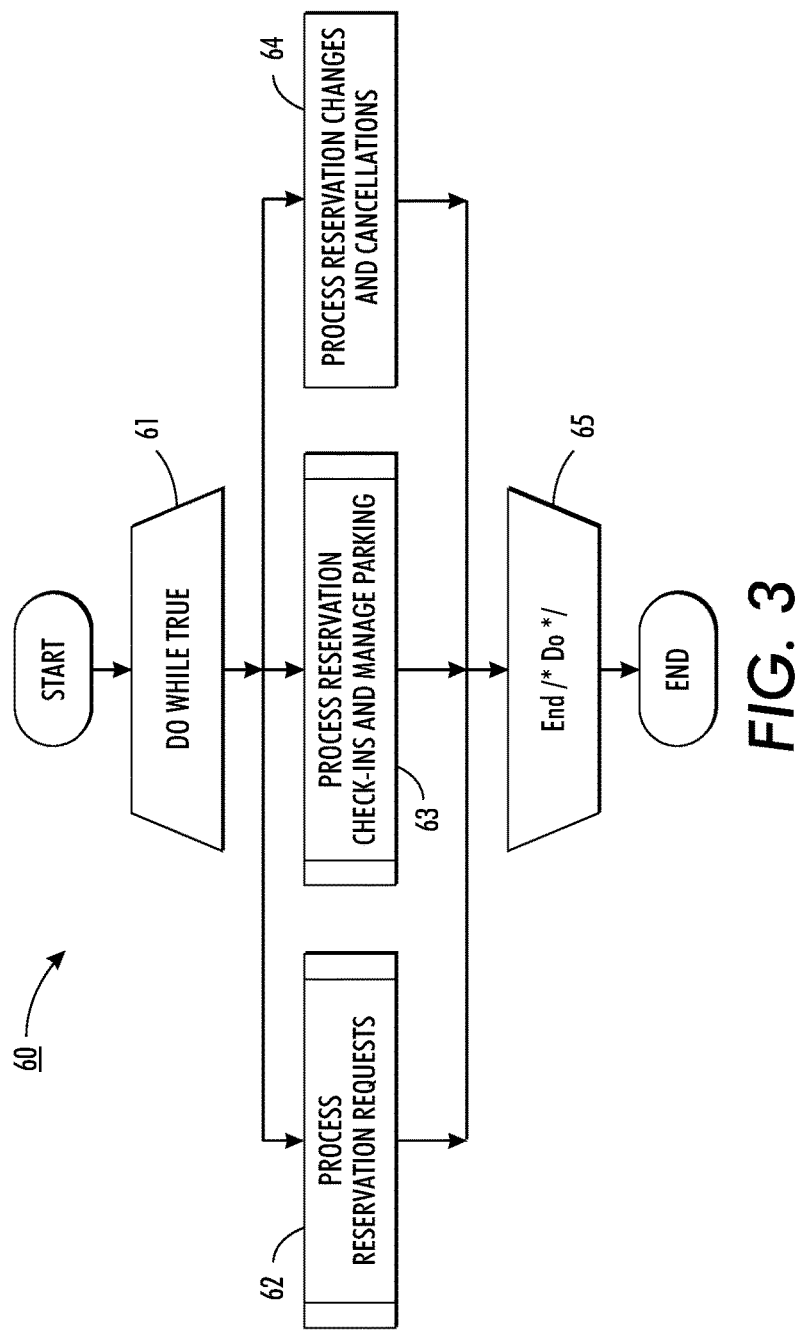
FIG. 3 is a flow diagram showing a computer-implemented method for managing interchangeable EV charging-capable parking spaces in accordance with one embodiment.

The pool 12 of parking spaces 13a-c and charging stations 21a-c are centrally managed to facilitate dual parking with charging and parking-only use. FIG. 3 is a flow diagram showing a computer-implemented method 60 for managing interchangeable EV charging-capable parking spaces in accordance with one embodiment. The method 60 is performed as a series of process steps by the parking servers 32 (shown in FIG. 2) or other computing devices in collaboration with driver devices, plus onboard location sensors, check-in and confirmation devices, parking meters or appliances, charging stations, deployed dynamic signage, and vehicle occupancy sensors.

Dual use parking is managed by handling three concurrent sets of processes (steps 61-65) as follows. In one set of processes, reservation requests for parking with charging and parking only are received and booked (step 62), as further described below with reference to FIG. 4. Other types of parking reservation requests may also be concurrently processed. In a second set of processes, parking reservation check-ins and confirmations are handled (step 63), as further described below with reference to FIG. 8.

Finally, in a third set of processes, changes to booked parking reservations are processed (step 64). Scheduling changes to booked parking reservations are only permitted under the same criteria applied when originally granted. Specifically, a parking reservation may be changed if the parking spaces 13b-c at the new start time are physically available based on both any unfulfilled pending parking reservations, that is, parking reservations that have not yet started, and any parking spaces in the desired parking pool that are currently occupied by another vehicle, as well as being permitted by any applicable parking regulations and prohibitions and local restrictions. Scheduling changes can include requesting additional or less parking with charging or parking-only time, rescheduling or postponing a booked parking reservation, and canceling a booked reservation. In addition, the requestors of any waitlisted parking with charging and parking-only reservation requests that have not yet been fulfilled or extended are notified if a change or cancellation of a booked reservation makes granting of the waitlisted parking reservation request possible, assuming that the requestor has not preauthorized acceptance and payment. Other types of changes to booked parking reservations are possible. Other sets of concurrent processes are possible. The first two sets of processes will now be discussed in detail.

Processing Dual Use Reservations

Figure 4A:
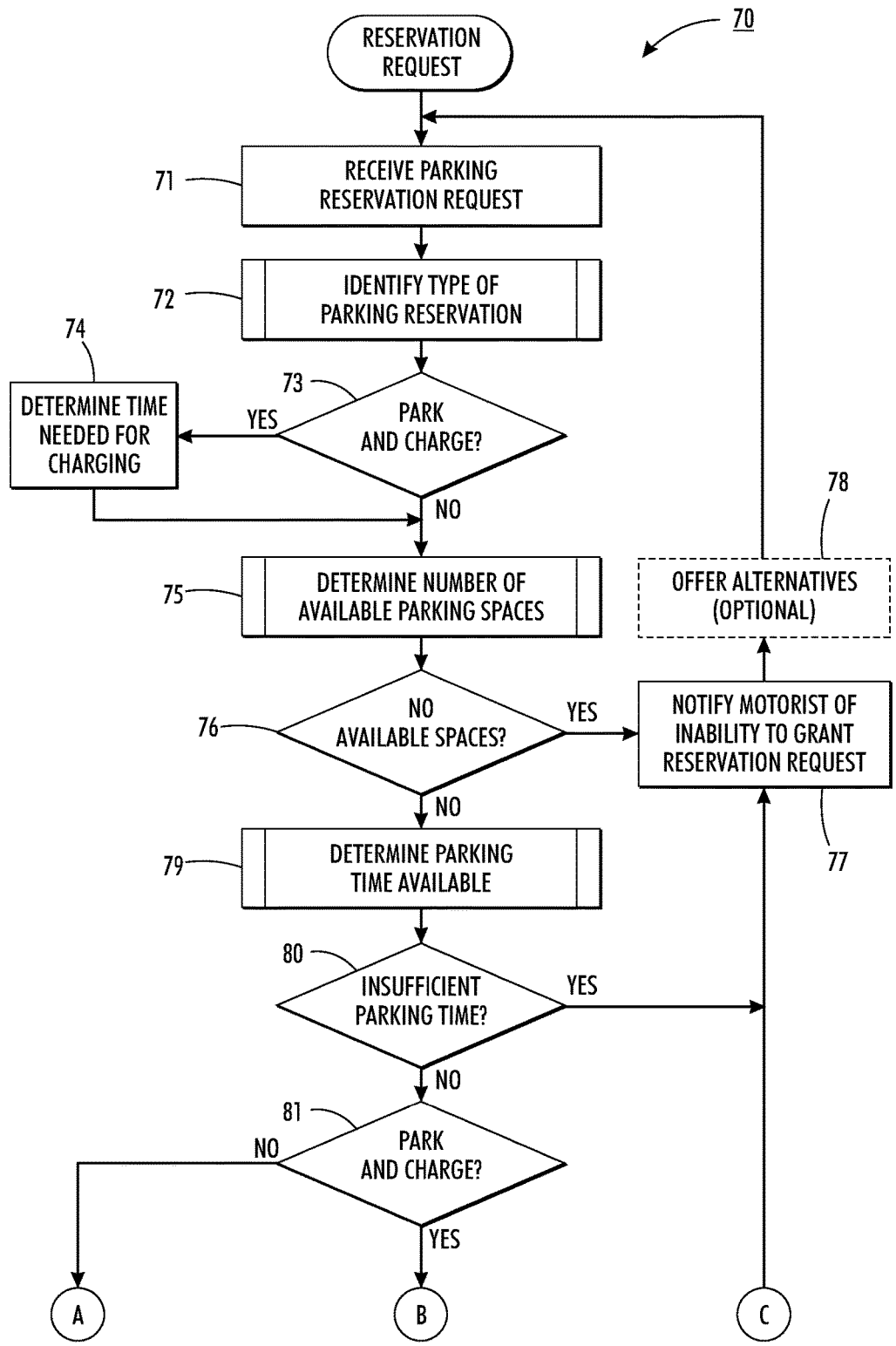
FIG. 4 is a flow diagram showing a routine for processing reservation requests for use in the method of FIG. 3.
Figure 4B:
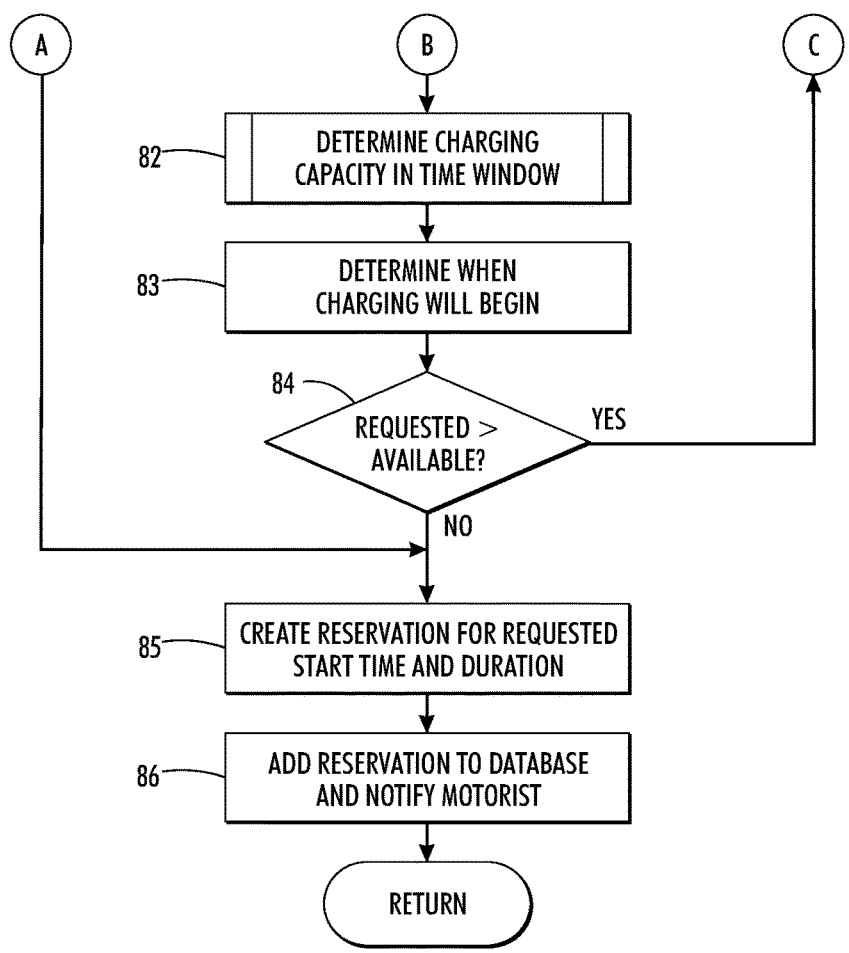

Reservation requests for parking with charging and parking only are concurrently received and booked. FIG. 4 is a flow diagram showing a routine 70 for processing reservation requests for use in the 60 method of FIG. 3. The method is carried out as a single transaction on unchanging data. The parking services 33 first receives a request from a motorist for a parking reservation (step 71), which includes the location of a parking pool 12 and a requested start time and duration or, alternatively, a start time and an end time. The motorist also identifies the type of parking reservation, that is, parking with charging or parking only (step 72). If the motorist indicates that EV charging is required, in addition to parking (step 73), the time needed for charging the motorist's particular model of EV 11 can be determined (step 74), although the motorist could request charging for only a certain time or energy, regardless of the actual computed time needed for (fully) charging or of any lack of knowledge of the actual time needed for charging.

Although the motorist includes a requested parking duration with the parking reservation request, the motorist might not know how the amount of time actually needed for charging the EV 11. To ensure that the motorist's expectations are adequately addressed, the parking services 33 can evaluate the duration of the parking reservation request in light of the amount of time needed by the reserved charging station 21a-c to charge the EV 11. For instance, the model of EV being parked by the motorist can be determined, either by the motorist manually identifying the EV model or by an automated query of the EV 11. The system then would consult the library of information about EV models and their batteries 41 (shown in FIG. 2) to estimate the maximum amount of charging time needed. EV battery charging time can vary by the electrical capabilities of the charging stations 21a-c and, for some charging stations 21a-c, the charging load expected.

EV charging utilizes a scarce resource and proper use and sharing is a matter of public interest. Owners or operators of charging stations 21a-c may therefore limit how long past the need to charge an EV 11a motorist will be allowed to park, which the parking services 33 can implement by setting a maximum parking with charging reservation duration. For example, the maximum duration could be a combination of the maximum time needed to charge the battery as assessed by the model of EV, plus a grace period. The system could also allocate an amount of time for a parking with charging reservation based on the estimate of the time needed to fully charge the EV 11 and require that the motorist move the EV 11 early if charging finishes sooner than estimated.

The maximum amount of parking with charging time is communicated to the motorist, who can then make an informed decision about the actual parking time needed. The motorist may need to confirm the requirement to move the EV 11 earlier than the full parking duration if charging takes less time than estimated. In a further embodiment, the reservation time may be later extended when permitted by circumstances.

Figure 5A:
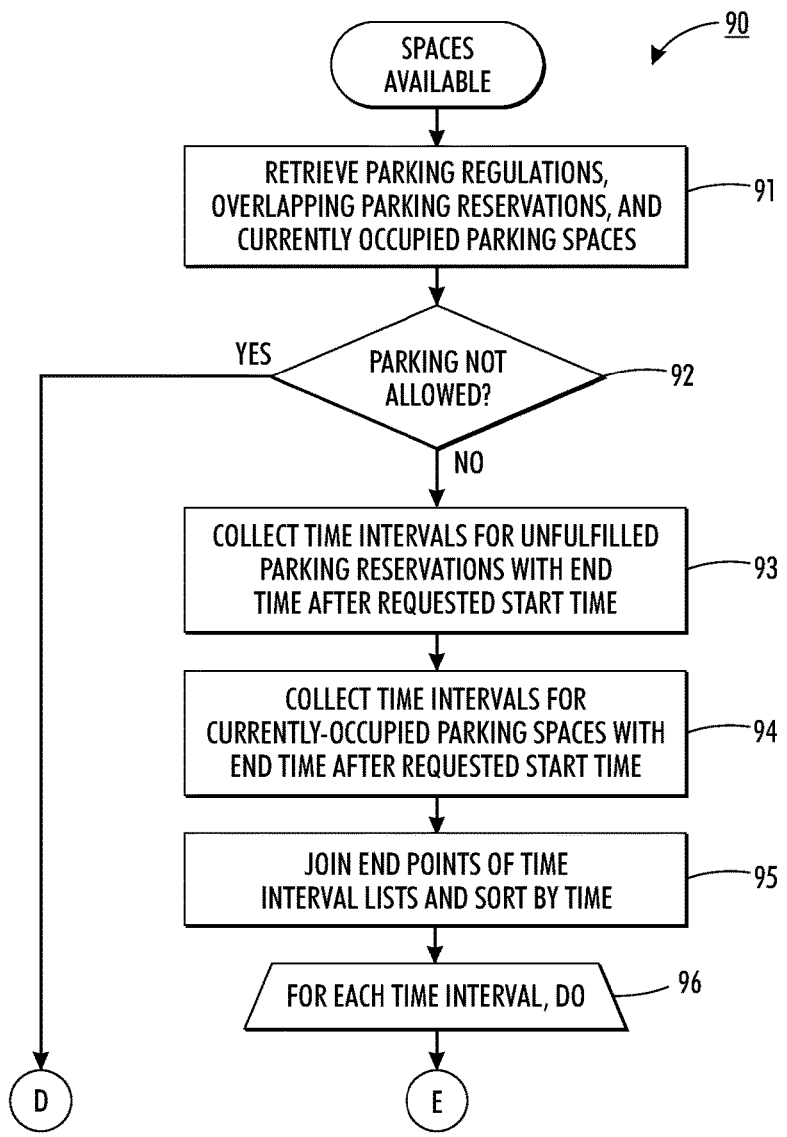
FIG. 5 is a flow diagram showing a routine for determining a number of available parking spaces for use in the method of FIG. 3.
Figure 5B:
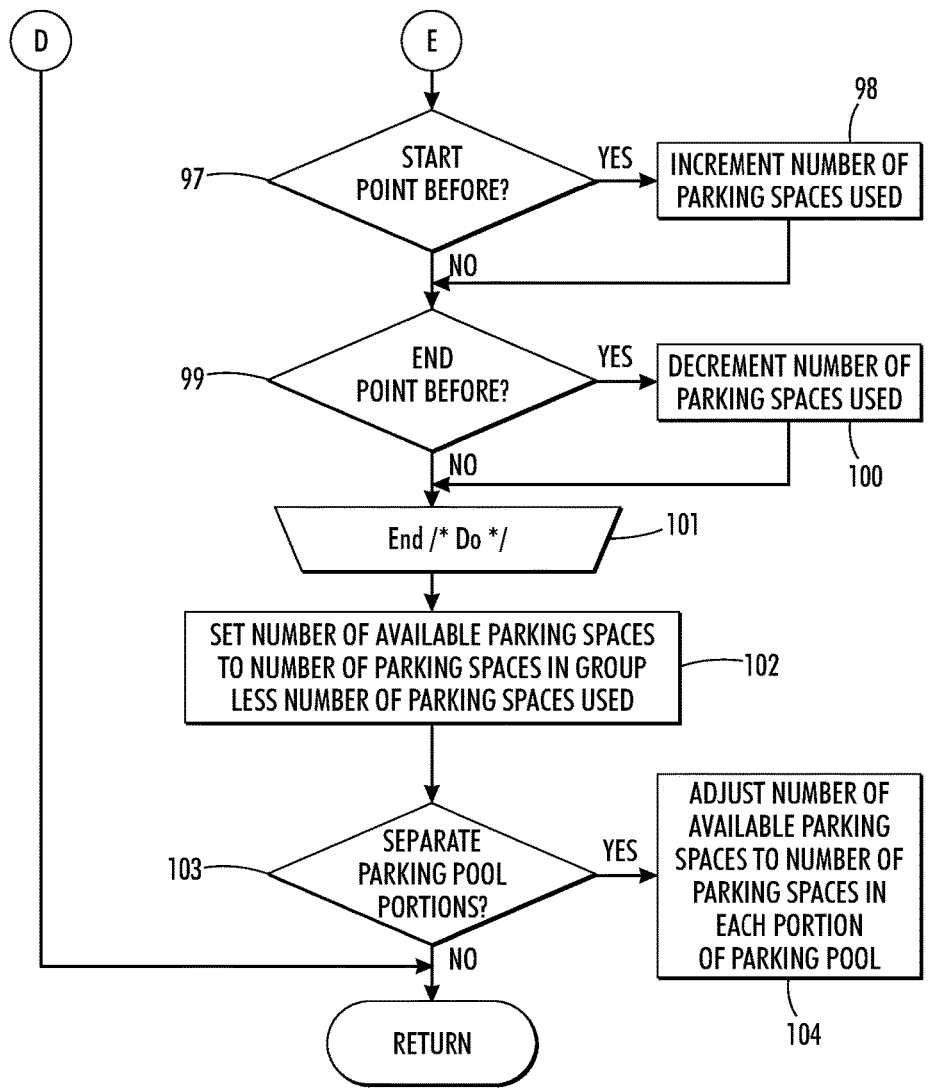

The number of available parking spaces 13b-c in the parking pool 12 for the requested start time is determined (step 75), as further described infra with reference to FIG. 5. If no parking spaces 13b-c are available (step 76), the reservation request fails and the motorist is notified of the parking service's inability to grant the request (step 77). In a further embodiment, the parking services 33 optionally offers alternative parking options within the general area of the parking pool 12 (step 78), which includes identifying other parking pools 12 within a set distance of the requested parking location with at least a specified amount of time available at the desired start time. If denied, a parking with charging reservation, the motorist could request to be added to the waitlist.

Figure 6A:
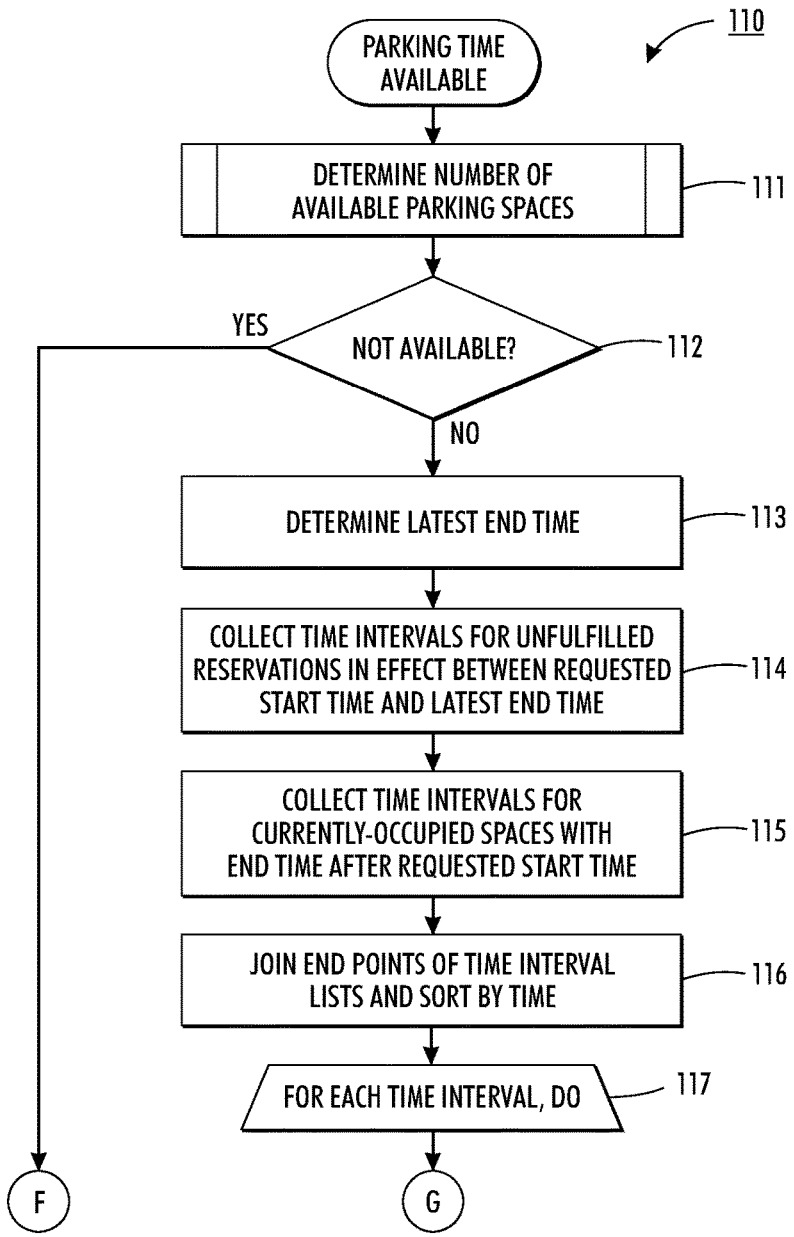
FIG. 6 is a flow diagram showing a routine for determining parking time available for use in the method of FIG. 3.
Figure 6B:
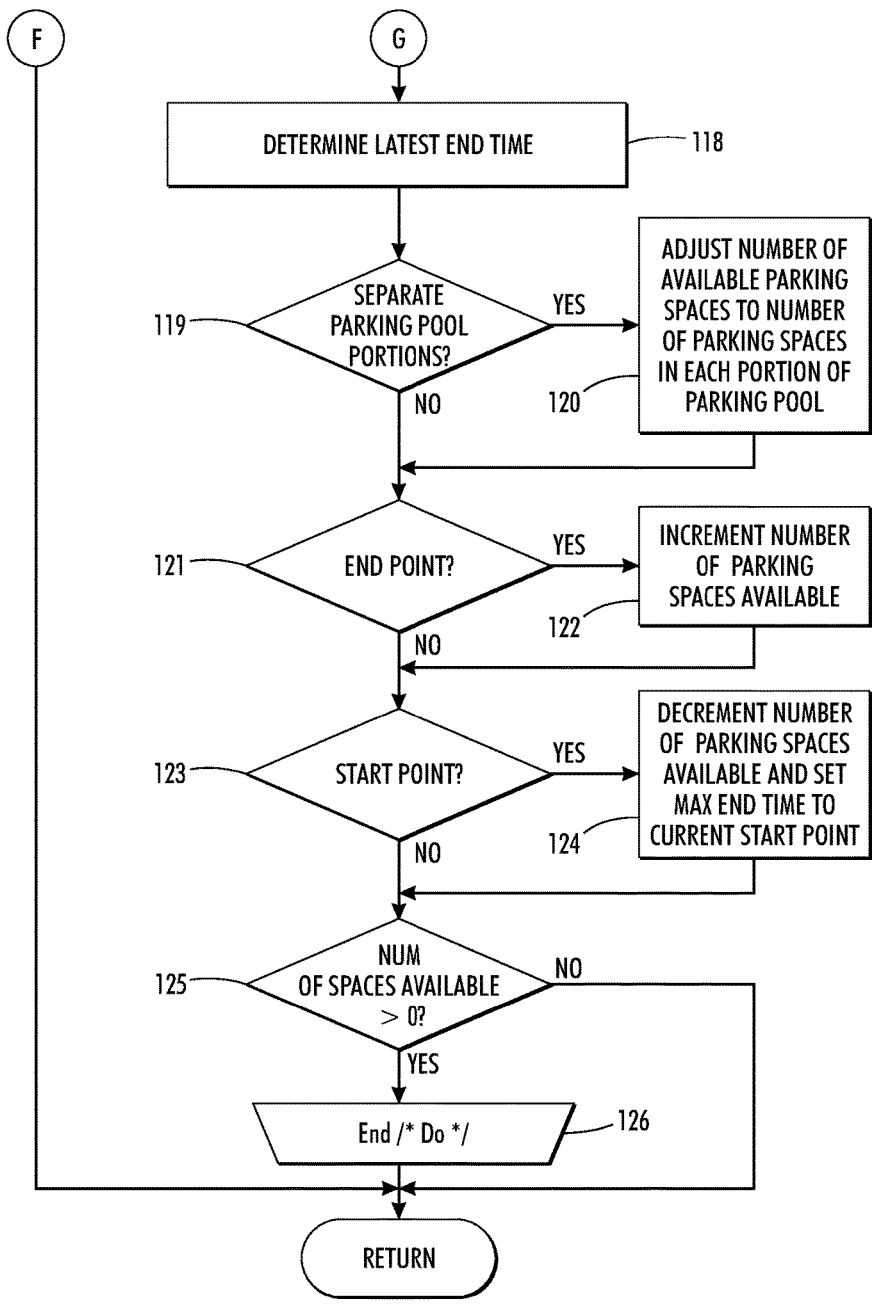

If parking spaces 13b-c are available (step 76), the time available for parking in the parking pool 12 is determined (step 79), as further described infra with reference to FIG. 6. If an insufficient amount of time is available to satisfy the reservation request (step 80), the reservation request is denied and the motorist is notified of the parking service's inability to grant the request (step 77) and, in a further embodiment, the parking services 33 optionally identifies alternative parking options (step 78). If denied a parking reservation, the motorist could request to be added to the waitlist. Otherwise, where parking is available for a sufficient amount of time (step 80) and the parking reservation request is for parking only (step 81), the parking services 33 creates a reservation record (step 85) for the requested time and duration, which is added to the reservations list 35 (shown in FIG. 2) and the motorist is notified (step 86).

Figure 7:
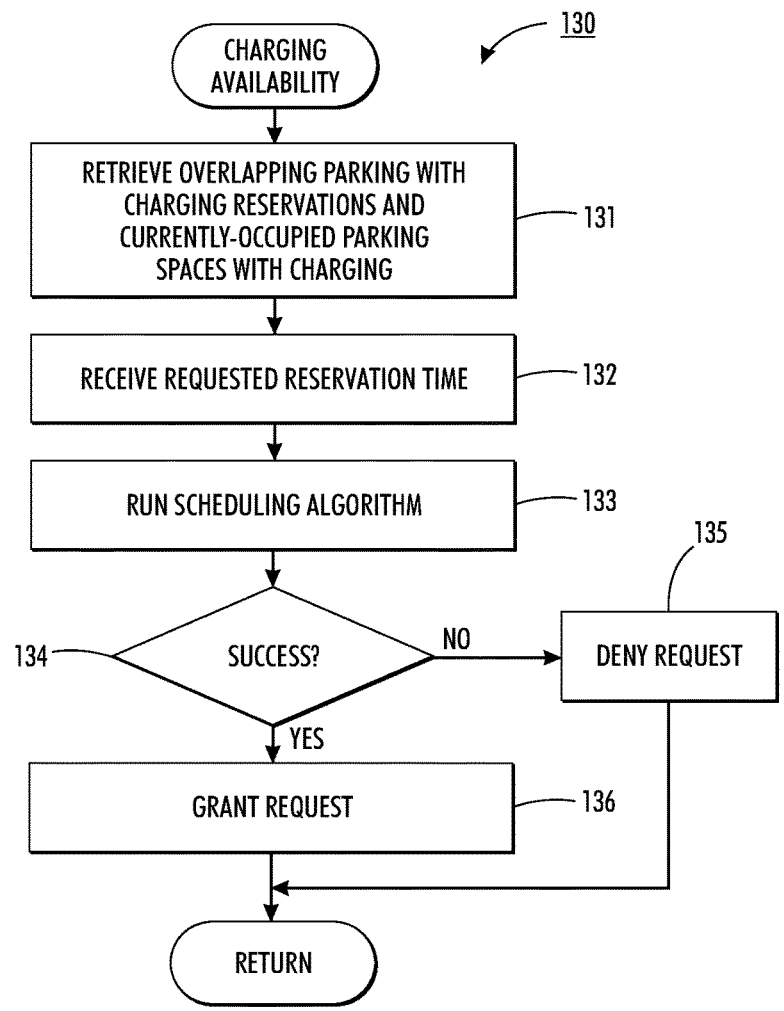
FIG. 7 is a flow diagram showing a routine for determining the availability of requested charging capacity for use in the method of FIG. 3.

If the parking reservation request is for parking with charging (step 81), the availability of requested charging capacity of the charging stations 21a-c in the parking pool 12 is determined (step 82), as further described infra with reference to FIG. 7. The parking pool 12 at the requested location may be configured with the number of charging stations 21a-c being less than the number of parking spaces 13a-c; even though all of the parking spaces 13a-c have equal access to the charging stations 21a-c, the charging stations 21a-c assigned to the parking pool 12 could have an aggregate charging capacity that is less than what is needed to simultaneously power the total number of ports 22a-c, so an EV 11 could be plugged-in, but not actively charging, pending the freeing up of charging capacity. Based on the charging capacity, a start time for charging is determined (step 83). By default, the parking services 33 is configured to deliver the amount of charging time reserved by the motorist at some point within the requested charging and parking reservation time window. However, the system can be configured to always begin charging immediately, to charge at the first opportunity that capacity is available, to charge when electricity price or demand are at certain levels, or whenever the driver selects, contingent upon on charging capacity availability, as determined supra. For a parking with charging reservation that includes parking beyond the time needed to charge the EV 11, a motorist may want to know when in the reservation the charging will actually begin, which the motorist can use in deciding whether to return early to the parked EV 11. The parking services 33 can inform the motorist at the time of booking the parking with charging reservation, or upon parking the EV 11, of the earliest and latest times that charging is expected to start, based on the server's knowledge of system capacity, existing reservations, and any expected changes in demand, electricity price, or other external factors that are incorporated into the server's scheduling.

If the requested time is more than the amount of time that is available (step 84), the reservation request is denied and the motorist is notified of the parking service's inability to grant the request (step 77) and, in a further embodiment, the parking services 33 optionally identifies alternative parking options (step 78). If denied a parking reservation, the motorist could request to be added to the waitlist. The available time could be determined as a single maximum charging time or as the summation of separate charging intervals within the requested charging and parking reservation time window, both of which would be dependent upon charging capacity. Otherwise, (step 84), the parking services 33 creates a reservation record (step 85) for the requested time and duration, which is added to the reservations list 35 (shown in FIG. 2) and the motorist is notified (step 86).

The managing of parking spaces 13a-c as a parking pool 12 of interchangeably reservable and EV charging-capable resources provides several benefits. First, preemption of parking by other motorists is avoided. Once a motorist makes a reservation in a parking pool 12 of equivalent parking spaces 13a-c, whether for parking with charging or parking only, further reservations that would preclude the motorist from parking and, if applicable, charging in the parking pool 12 at the reserved time will not be allocated by the parking services 33. Thus, absent interference from parking scofflaws or other unforeseen circumstances, parking with charging or parking only are guaranteed. In addition, once a motorist has accepted a reservation and has parked his vehicle in the parking pool 12, the motorist is not required to move the vehicle for the duration of the reservation, or return to unplug the EV 11, if applicable, as all of the parking spaces 13a-c in a parking pool 12 have equal access via plugs or other necessary hardware to charging stations 21a-c and the EV 11 could remain plugged-in or otherwise physically connected to the charging station 21a-c whilst parked after completion of charging. If a motorist wants extend to the duration of a parking session, the parking services 33 can offer more parking time if reservation cancellations or early departures from any of the parking spaces 13a-c in the parking pool 12 make more parking time available, which the system can process automatically if the motorist preauthorizes a parking time extension and payment of fees. Similarly, if a vehicle occupancy sensor 49 detects that a vehicle has left a parking space 13c before the end of the paid or reserved period, the parking space 13c is made available to other motorists. Analogously, if a charging station 21a-c finishes charging an EV 11 early, the charging station's capacity can be made available to other EVs within the parking pool 12 who are awaiting charging. Finally, the pricing structure and rules about how long a motorist can charge an EV 11 or park any vehicle, whether an EV or non-EV, in a parking space 13a-c without charging may automatically change over time based on fixed regulations or could be dynamically adjusted to reflect demand or other considerations, provided that such dynamic adjustments will not affect reservations made in advance.

Determining Available Parking Spaces

The number of parking spaces 13b-c that are physically available at a particular point in time depends upon both any unfulfilled pending parking with charging and parking-only reservations and any parking spaces 13c in the desired parking pool 12 that are currently occupied by another vehicle 11, as well as any applicable parking regulations and prohibitions 37 and local restrictions 42.

FIG. 5 is a flow diagram showing a routine 90 for determining a number of available parking spaces for use in the method 60 of FIG. 3. The routine is carried out as a single transaction on unchanging data. To determine the number of available parking spaces 13a-c, the parking services 33 first retrieves the parking regulations 37 and local restrictions 42 (shown in FIG. 2) applicable to the parking spaces 13a-c in the desired parking pool 12, the set of parking with charging and parking-only reservations 35 for the parking pool 12 that overlap the requested reservation in which the reserving motorist's vehicle has not yet arrived, the parking with charging and parking-only contracts 36 for the currently-occupied parking spaces 13c in the parking pool 12, and the total number 38 of parking spaces 13a-c in the parking pool 12 (step 91). If the requested start time is at a time when parking is not allowed (step 92), no parking is available in the parking pool 12.

Otherwise, the time intervals for all of the unfulfilled parking with charging and parking-only reservations 35 where the end time of the reservation is after the requested start time are collected (step 93). Similarly, the time intervals for all of the parking with charging and parking-only contracts 36 for currently-occupied parking spaces 13c where the end time is after the requested start time are collected (step 94). The end points from the two lists of time intervals are joined and sorted in ascending order by time (step 95). The number of parking spaces used is set to zero, and the time points in each time interval in the joined and ordered lists is processed (steps 96-101), as follows. First, if the time point is the start time of the current time interval and the time point occurs before the requested start time (step 97), the number of parking spaces used is incremented (step 98). If the time point is the end time of the current time interval and the time point occurs before the requested start time (step 99), the number of parking spaces used is decremented (step 100). Processing continues with each of the remaining time points (step 101). Thereafter (step 101), the number of available parking spaces is set to the total number of parking spaces 13a-c in the parking pool 12 less the number of parking spaces used (step 102).

Depending upon the configuration of the parking pool 12, a portion of the parking spaces 13a-c in the parking pool 12 might be held for parking by any kind of vehicle and another portion would be reserved for parking with charging by EVs. The available parking spaces in the parking pool 12 are adjusted for each portion of the parking pool 12 with a separate number of parking spaces available for parking with charging and a separate number of parking spaces available for parking only. When a parking space 13c becomes free, that parking space's availability is added to both of the parking availability numbers, as all parking spaces 13a-c within a parking pool 12 are considered interchangeable. Thus, if the parking pool 12 is separated into portions (step 103), the number of available parking spaces for each portion, that is, parking with charging and parking-only, is limited to the number of parking spaces allotted to that portion if the overall number of parking spaces available is greater than the number of parking spaces in that portion (step 104).

In further embodiments, the number of available parking spaces, whether for parking with charging or parking-only, is determined based upon optimistic or pessimistic parking resource utilization forecasts. For example, optimistic forecasts include predicting that some vehicles will leave before the end of their reserved parking period and make currently-occupied parking spaces 13c potentially free prior to the start time of a requested parking reservation. Optimistic forecasts also include predicting that some motorists will not show up for their parking with charging and parking-only reservations and potentially leave their parking with charging and parking-only reservations unused. On the other hand, pessimistic forecasts include predicting that some that motorists will disregard parking regulations and existing reservations and potentially park in the parking spaces 13a-c in a parking pool 12 without authorization, that is, without paying or first reserving parking. Other optimistic or pessimistic parking resource utilization forecasts are possible.

In still further embodiments, the duration of vehicle occupancy of currently-occupied parking spaces 13c can adjusted based upon payment status. Specifically, if a parking space 13c is occupied, the parking space 13c can be considered unavailable for some amount of time, depending upon the circumstances. For example, if the use of the parking space 13c is paid, the parking space 13c could be held from parking with charging and parking-only reservations until the paid time expires. However, if the parking space 13c is unpaid, but the vehicle recently arrived, for instance, within the last couple of minutes, the parking space 13c could be locked temporarily from parking with charging and parking-only reservations for the maximum amount of time that may be purchased. This time buffer would provide motorists with time to complete check-in without having their expected parking time pre-empted by an intervening parking reservation request. Finally, if the parking space 13c is unpaid and in violation, the parking space 13c should be considered locked for some configurable amount of time under a reasonable probability that the vehicle would be moved or towed. Other adjustments to vehicle occupancy duration are possible.

In a yet further embodiment, parking with charging and parking-only reservations for an indefinite duration are handled in one of two possible ways. First, open-ended parking with charging and parking-only reservations, that is, a request for parking with a maximum permissible or even undefined ending time, if not otherwise precluded, can be discouraged by disallowing parking reservation requests that extend too far into the future. This option also accommodates the possibility of changing parking policies over extended periods without the risk of upsetting existing, albeit indefinite, parking with charging and parking-only reservations. Alternatively, open-ended parking with charging and parking-only reservations can be accommodated by simply decreasing the number of the parking spaces 13a-c in the parking pool 12 until the vehicle departs from one of the parking spaces 13c. Other ways to handle indefinite open-ended parking with charging and parking-only reservations are possible.

In a still further embodiment, "minimal spacing intervals" are introduced that enable the public to park conveniently and avoid some confrontation, given a certain degree of uncertainty and delay in human activities. The sizes of the various intervals are set as policy parameters by the parking authorities and would typically be in the range of five to fifteen minutes. The intervals include:

Minimal Gap—Pre-Reservation Interval. This interval is a minimum gap of time before a pending parking reservation during which another motorist is allowed to park. This interval allows for some uncertainty in case a motorist arrives a few minutes early for a reservation.

Minimal Forward Interval. This interval is a minimum gap of time into the future at which a reservation can be made. The minimum forward interval reduces the importance of a race condition between a motorist pulling into an available parking space 13b-c and an online user making a competing parking reservation. By precluding the making of remote reservations that begin immediately, the parking services 33 favor a motorist pulling into a parking space and requesting parking using a parking meter or appliance.

Minimum Afterwards Interval. This interval is a gap of time after a parking reservation or the end of a parking contract before which another parking reservation can be made. The minimum afterwards interval anticipates that motorists sometimes return late to a parking space and reduces conflicts that may arise when a motorist is late in returning to move a vehicle at the end of a parking session. In a yet further embodiment, the parking authorities may cite motorists for departing late from their parking space.

Pre-reservation grace period. This interval is a grace period provided when a motorist arrives early to a previously-reserved parking space. Parking policies may dictate whether an early-arriving motorist must then give up some time at the end of the reservation period.

Late arrival grace period. This interval is a gap of time during which a motorist can be late in arriving to park before a parking reservation is cancelled by the parking services 33. The treatment of late arrivals to reserved parking spaces can be governed by further parking policies. For example, a motorist may be contacted when the grace period is almost over and given an opportunity to extend. Alternatively, the motorist may purchase a "hold guarantee" that holds the parking reservation for an extended period, such as 15 minutes and the motorist would get a partial refund for cancelling the held parking reservation.

Other minimal spacing intervals are possible.

Determining Available Parking Time

The time available for parking in a parking pool 12 at a particular point in time depends upon both any unfulfilled pending parking with charging and parking-only reservations and any parking spaces 13a in the desired parking pool 12 that are currently occupied by another vehicle 11, whether for parking with charging or parking only. FIG. 6 is a flow diagram showing a routine 110 for determining parking time available for use in the method 60 of FIG. 3. This routine determines the amount of time available for parking in a parking pool 12 at a requested time. The routine is carried out as a single transaction on unchanging data. To determine the time available for parking, the parking services 33 first determines the number of available parking spaces 13b-c in the parking pool 12 for the requested start time (step 111), as further described supra with reference to FIG. 5. If no parking spaces 13b-c are available (step 112), the reservation request fails. Otherwise, if parking spaces 13b-c are available (step 112), based upon the applicable parking regulations, the latest end time for parking is determined (step 113) as the requested start time, plus the maximum permitted parking time as of the requested start time.

Next, the time intervals for all of the unfulfilled parking with charging and parking-only reservations that are in effect between the requested start time and the latest end time are collected (step 114). Similarly, the time intervals for all of the parking contracts for currently-occupied parking spaces 13a where the end time is after the requested start time are collected (step 115). The end points from the two lists of time intervals are joined and sorted in ascending order by time (step 116). The maximum end time is set to zero, and the time points in each time interval in the joined and ordered lists are processed (steps 117-126), as follows. First, the latest end time for parking based on the current time interval is determined (step 118). If the parking pool 12 is separated into portions (step 119), the number of available parking spaces for each portion, that is, parking with charging and parking-only, is limited to the number of parking spaces allotted to that portion if the overall number of parking spaces available is greater than the number of parking spaces in that portion (step 120). If the time point is the end time of the current time interval (step 121), the number of available parking spaces 13b-c in the parking pool 12 is incremented (step 122). If the time point is the start time of the current time interval (step 123), the number of available parking spaces 13b-c in the parking pool 12 is decremented and the maximum end time is set to the start time of the current time interval (step 124). If the number of available parking spaces 13b-c in the parking pool 12 is greater than zero (step 125), processing continues with the next time point (step 126). Otherwise, the maximum available time has been found and processing of the time points is complete (step 126).

Determining Charging Capacity Availability

A parking pool 12 may be configured where the number of charging stations 21a-c is less than the number of parking spaces 13a-c in the parking pool 12, which makes simultaneously charging EVs in all of the parking spaces 13a-c not possible. Each of the parking spaces 13a-c has equal access to a port 22a-c. Notwithstanding, the charging stations 21a-c assigned to the parking pool 12 could have an aggregate charging capacity that is less than what is needed to simultaneously power the total number of ports 22a-c, so an EV 11 could be plugged-in, but not actively charging, pending the freeing up of charging capacity. Here, charging capacity is defined as the ability of one of the charger in the charging stations 21a-c to provide the electrical power and energy needed to charge the battery in an EV 11; the charger may be limited by safety considerations of the hardware, the amount of hardware provided, software limitations in the system determined by the manufacturer, owner or operator, or other factors. For these types of parking pools 12, the parking services 33 must determine if there is the available charging capacity for the requested time for charging within a requested parking reservation window. FIG. 7 is a flow diagram showing a routine 130 for determining the availability of requested charging capacity for use in the method 60 of FIG. 3. The routine is carried out as a single transaction on unchanging data. Given a set number of parking with charging reservations, the time at which charging begins and ends within each reservation can be scheduled using different scheduling techniques, which the parking services 33 can vary or adapt based on demand, capacity, the price of electricity, a driver's requested start time, or other factors. The charging time can be based on either a motorist's request for charging time or the parking service's estimate of the maximum charging time for the EV 11 or on the maximum allowable charging time, given regulations 37 and local restrictions 42. For example, the parking services 33 can schedule charging to always begin at the start of every parking with charging reservation, at some point within a parking with charging reservation, broken up into shorter intervals of charging within a parking with charging reservation, as a combination of fast and slow rates of charging, to maximize the number of EVs being charged at once, and so forth.

To determine if the charging stations 21a-c will have charging capacity available at the requested location during the time window set by the requested parking with charging reservation, the parking services 33 first retrieves the set of parking with charging reservations 35 for the parking pool 12 that overlap the requested reservation in which the reserving motorist's vehicle has not yet arrived and the parking with charging contracts 36 for the currently-occupied parking spaces 13c in the parking pool 12, if applicable, and the total number 38 of parking spaces 13a-c in the parking-with-charging portion of the parking pool 12 (step 131). The requested reservation time, as requested by the motorist, is also received (step 132). A scheduling algorithm is run against the unfulfilled parking with charging reservations 35, either for all of the parking spaces 13a-c if the parking pools 12 is not apportioned, or against the parking-with-charging portion of the parking pool 12, and the parking with charging contracts 36 for currently-occupied parking spaces 13c (step 133). Scheduling is based on the active charging provided to the parking spaces 13a-c in the parking pool; even though all of the parking spaces 13a-c in a parking pool 12 have equal access to the charging stations 21a-c, the charging stations 21a-c assigned to the parking pool 12 could have an aggregate charging capacity that is less than what is needed to simultaneously power the total number of ports 22a-c, so an EV 11 could be plugged-in, but not actively charging, pending the freeing up of charging capacity. If the scheduling algorithm succeeds (step 134) so that all reservations, including the reservation that is being requested at the moment, have the requested time for active charging, the reservation request for parking with charging is granted (step 136). If the scheduling algorithm fails (step 134), which means that the existing reservations and the reservation that is being requested do not all have the requested time for active charging within the respective reservation windows, the request for a reservation for parking with charging is denied (step 135). If denied, the motorist could request to be added to the waitlist.

Optionally, the scheduling algorithm can be run iteratively for shorter times until the scheduling succeeds and the first amount of charging time at which the scheduling algorithm succeeds is the maximum charging time available for the requested reservation. The parking services 33 then tells the motorist the maximum amount of charging time possible in the requested parking reservation window and the motorist can choose whether to proceed with reserving with this allowable charging time. Optionally, the scheduling algorithm can also include a more general optimization for having charging start immediately, when electricity is the least expensive or based on other considerations, as mentioned supra In one embodiment, the parking services 33 uses an earliest deadline first scheduling algorithm, although other scheduling algorithms could be used. Here, whichever EV 11 has the earliest deadline, which is the end of the reservation period, has priority to begin charging first. If all deadlines are met, the scheduling is successful. If not, the scheduling has failed and the requested additional charging request will be unworkable. The algorithm can embody the notion that until an EV 11 is actively being charged, the charging can be rescheduled within the given reservation.

In a further embodiment, a simpler scheduling algorithm is employed, which uses a schedule that is fixed at any point in time for any parking with charging reservations that have already been made. When a new parking with charging reservation is requested, the parking services 33 looks for a block of time within the requested parking reservation window in which there is available charging capacity. If more than one qualifying block of time is available, the scheduling algorithm choose the first block of time available, although other time block selection criteria could be used. The scheduling algorithm can also offer the option of making up the requested charging time by piecing together non-consecutive blocks of available charging time within the reservation window.

Reservation Check-Ins and Confirmations

Figure 8:
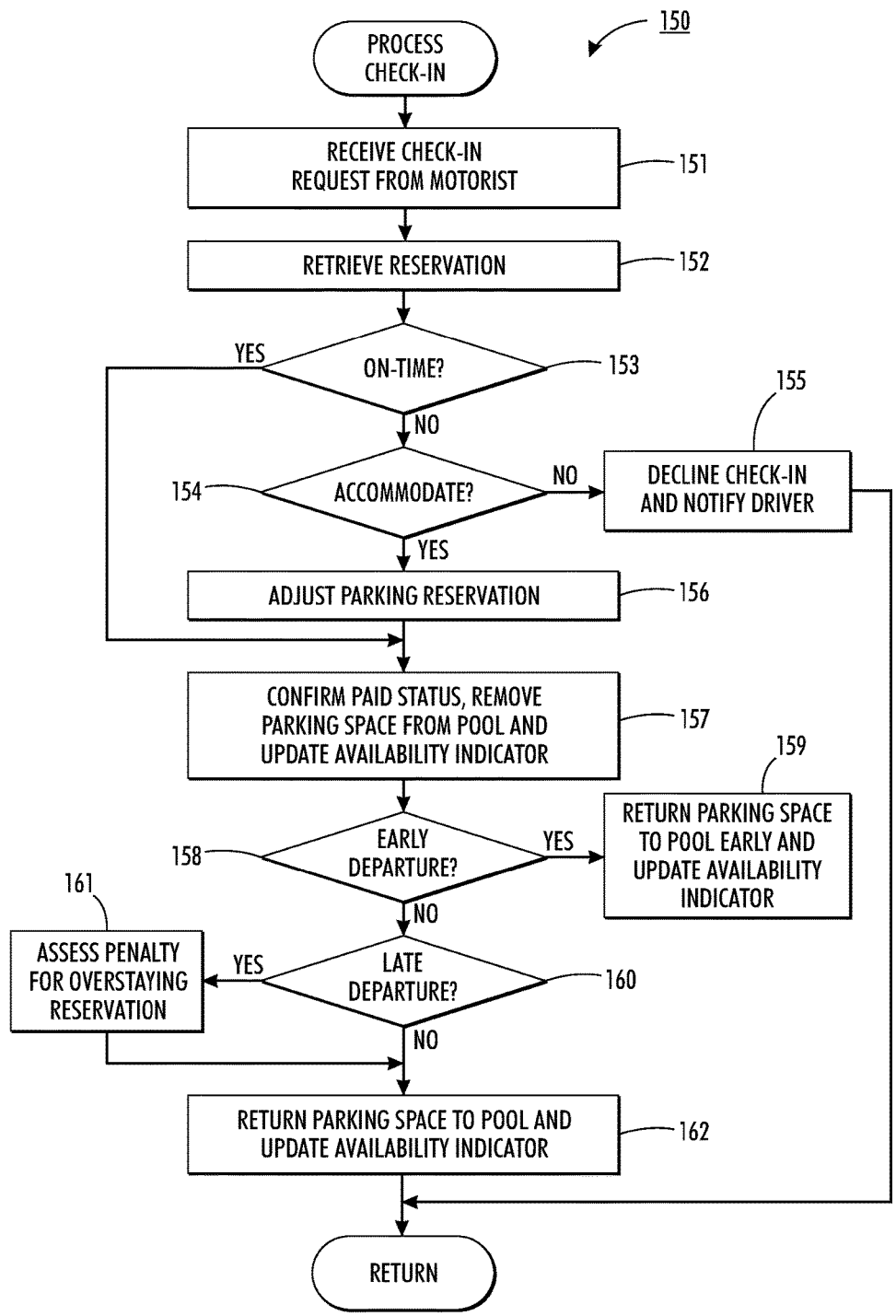
FIG. 8 is a flow diagram showing a routine for processing reservation check-ins for use in the method of FIG. 3.

Parking reservation check-ins and confirmations are handled concurrent to the receipt and booking of parking reservations and the making of parking reservation changes and cancellations. FIG. 8 is a flow diagram showing a routine 150 for processing reservation check-ins for use in the method 60 of FIG. 3. A check-in request is first received from a motorist (step 151) using a device, as described supra. The motorist's parking reservation 39 is retrieved (step 152). If the motorist is on-time (step 153), the reservation and paid status are confirmed, the parking space 13a-c is removed from the pool of available parking, and the parking availability indicator 15a-c, 19 is updated to indicate that the parking space is in use (step 157). If the reservation is for parking and charging, the motorist also plugs his vehicle into a port 22a-c on one of the charging stations 21a-c or, in a further embodiment, parks over the inductive charging pad.

Otherwise, if the motorist is either early or late, the parking services 33 evaluates whether parking can be accommodated (step 154) based on inter alia applicable parking regulations 37 and any local restrictions 42, other pending reservations 35 and, if pooled parking, current occupancy 36. If early or late parking can be accommodated (step 154), the motorist's parking reservation is adjusted (step 156) and reservation confirmation proceeds (step 157). Otherwise, when accommodation is not possible (step 154), check-in is declined and the motorist is notified (step 155).

The motorist parks and, at some point, leaves. If the motorist is departing early (step 158), the parking space 13a-c is returned to the pool of available parking, thereby making the parking space 13a-c available for use by other motorists early, and the parking availability indicator 15a-c, 19 is updated to indicate that the parking space is available (step 159). The charging capacity freed up by the early departure of an EV 11 enables the charging station 21a-c to become available to another EV 11, so long as capacity to drive a charging current through a port 22a-c is available. If the motorist of an EV 11 or non-EV is departing late (and has not been notified or otherwise dealt with), or if the motorist is impermissibly parking an EV 11 without charging (step 160), a penalty for overstaying the parking reservation may be assessed (step 161), among other negative dispositions. Finally, whether the motorist is departing on-time or late, the parking space 13a-c is returned to the pool of available parking, along with the charging capacity of the charging station 21a-c upon completion of charging, if applicable, and the parking availability indicator 15a-c, 19 is updated to indicate that the parking space is available (step 162).

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for managing interchangeable EV charging-capable parking spaces, comprising:

providing access to at least one vehicle charging station for electrically-chargeable vehicles at parking spaces in a parking pool;

identifying via one or more sensors a number of the parking spaces in the parking pool that are currently-occupied by already-parked vehicles;

further identifying any existing reservations to park in the parking spaces in the parking pool by yet-to-arrive vehicles;

receiving from a user via one of a computing device and a parking kiosk a parking reservation request comprising a parking start time, parking duration, and parking with charging via a personal device; and monitoring by a server use of the parking spaces in the parking pool that are not among the currently-occupied parking spaces nor among the parking spaces in the parking pool that will be used to fulfill the existing reservations as available parking spaces, comprising:

granting the parking reservation request upon identification of the available parking spaces and notifying the user of the parking availability;

when the parking request specifies parking with charging, determining by the server a duration of charge during the parking duration;

determining by the server whether the parking duration exceeds the charging duration;

subsequent to granting of the parking reservation request, scheduling by the server a span of time between an earliest time and a latest time during which charging will occur during the parking duration when the parking duration exceeds the charging duration;

informing the user of the scheduled time span during which charging will occur; and controlling by the server, scheduling of the charging, the charging comprising delivery of electricity from the vehicle charging station to the electrically-chargeable vehicle based on the scheduled earliest time and the latest time of the time span during the parking duration, wherein the charging is scheduled as a summation of separate charging sessions during the parking duration.

2. A method according to claim 1, further comprising:

determining by the server a number of the parking spaces in the parking pool that are available at the start time free of the currently-occupied parking spaces and the parking spaces needed to fulfill the existing reservations when the parking request comprises parking only;

determining by the server time available to park in the parking pool through the parking duration free of the currently-occupied parking spaces and the parking spaces needed to fulfill the existing reservations; and creating a reservation provided that the number of available parking spaces in the parking pool and the time available are sufficient to satisfy the parking duration of the parking reservation request beginning at the start time.

3. A method according to claim 2, wherein the parking reservation request comprises a request for on-the-spot parking and the start time comprises the current time.

4. A method according to claim 2, further comprising:
when the parking request comprises parking and charging, determining whether any of the charging stations at the parking pool have charging capacity available for the charging duration at some point during the parking duration beginning at the start time, wherein the charging capacity for each charging station comprises an aggregate charging capacity that is less than or equal to a total number of charging ports associated with that charging station; and
granting the charging request provided that the charging capacity is sufficient to satisfy the charging duration of the charging request.

5. A method according to claim 4, further comprising:
supplying a capacity to simultaneously charge a number of electrically-chargeable vehicles that is less than or equal to the number of the parking spaces in the parking pool; and
evaluating by the server the simultaneous charging capacity of the parking pool to satisfy the charging duration of the charging request during the requested parking reservation, comprising:
running a scheduling algorithm; and
finding the simultaneous charging capacity to be sufficient for the charging request only if the scheduling algorithm determines that remaining charging capacity is available in the requested parking time period.

6. A method according to claim 5, further comprising:
evaluating by the server active charging of any electrically-chargeable vehicles in the currently-occupied parking spaces;
determining by the server reserved charging capacity required by any electrically-chargeable vehicles that have yet to arrive in the parking spaces needed to fulfill the existing reservations;
determining by the server whether sufficient charging time exists within requested parking time for all vehicles currently parked and all existing reservations in addition to a new charging request, subject to the end-times of the reservations and the simultaneous charging capacity; and
determining by the server whether there is charging capacity available for an amount of time needed for the requested charging duration during the requested parking reservation based on the active charging and the reserved charging capacity.

7. A method according to claim 5, further comprising:
iteratively re-running the scheduling algorithm for shorter durations than the charging duration first-requested until the scheduling algorithm succeeds in finding the charging capacity sufficient to satisfy the current shorter duration.

8. A method according to claim 4, further comprising:
supplying a capacity to simultaneously charge a number of electrically-chargeable vehicles that is less than or equal to the number of the parking spaces in the parking pool; and
allowing an electrically-chargeable vehicle to connect to one of the charging stations at the start time of the parking reservation regardless of whether charging of the electrically-chargeable vehicle actually begins at the start time.

9. A method according to claim 4, further comprising:
holding a portion of the parking spaces in the parking pool for parking reservation requests that comprise charging requests;
holding a remaining portion of the parking spaces in the parking pool for parking reservation requests that comprise parking only; and
adjusting the number of available parking spaces in the parking pool, comprising:
limiting by the server the number of available parking spaces in the parking pool for parking with charging parking reservation requests to a number of the parking spaces in the parking with charging portion of the parking pool; and
limiting by the server the number of available parking spaces in the parking pool for parking only parking reservation requests to a number of the parking spaces in the parking only portion of the parking pool.

10. A method according to claim 4, wherein the charging duration comprises one of an expressly-requested amount of time, an estimated maximum amount of time needed to charge the electrically-chargeable vehicle, and a maximum allowable charging time as permitted by applicable regulations.

11. A method according to claim 4, further comprising at least one of:
receiving a speed of charging as part of the charging request; and
notifying a motorist holding a parking reservation with charging that charging of the motorist's electrically-chargeable vehicle has started or stopped.

12. A method according to claim 4, further comprising at least one of:
setting a pricing structure for parking in the parking pool based on charging a premium fee for parking beyond time needed to charge an electrically-chargeable vehicle, changing prices based on demand for parking, or imposing extra fees if a vehicle is not moved within a set time window after the reservation ends;
setting a pricing structure for charging an electrically-chargeable vehicle based upon an amount of electricity used, an amount of time that the charging station is in-use, on a per-use flat fee basis, rate of charging, cost of electricity, demand for charging, or scheduling time of charging; and
setting a purchasing structure for drawing electricity from an electrically-chargeable vehicle into the charging station.

13. A method according to claim 4, further comprising:
transacting automated parking reservation service buyouts by an interested motorist, comprising:
identifying a type of parking reservation service desired by the interested motorist, the parking reservation service type comprising one of parking with charging, parking only or charging capacity that has been added to an existing parking reservation, which converts the parking reservation into a parking with charging parking reservation;
notifying other motorists holding parking reservations comprising the same type of parking reservation service that the interested motorist would like to buy out the reservation; and
allowing the interested motorist to buy the parking reservation service upon acceptance of the buy out by the other motorist.

14. A method according to claim 2, further comprising:
maintaining a waitlist comprising at least one motorist whose parking reservation request has been denied; and
managing by the server the waitlist, comprising:
  offering a reservation to the waitlisted motorist upon a change or cancellation of another parking reservation overlapping the start time and parking duration of the denied parking reservation request and creating a reservation for the waitlisted motorist upon acceptance by the motorist of the offer;
  offering a reservation to the waitlisted motorist upon a change or cancellation of another parking reservation overlapping the start time and parking duration of the denied parking reservation request, and leaving the waitlisted motorist on or removing the waitlisted motorist from the waitlist upon rejection by the motorist of the offer; and
  leaving the waitlisted motorist on the waitlist in an absence of a change or cancellation of another parking reservation overlapping the start time and parking duration of the denied parking reservation request until an expiry of the requested start time and parking duration, at which time the waitlisted motorist is removed from the waitlist.

15. A method according to claim 2, further comprising:
identifying parking restrictions and prohibitions and local restrictions applicable to the parking spaces in the parking pool; and
reducing the number of the parking spaces in the parking pool that are available at the start time by those of the parking spaces subject to the parking prohibitions.

16. A method according to claim 2, further comprising at least one of:
  placing a limit on a total number of reservations or vehicles from any one motorist within a set period of time; and
  placing a limit on a total number of reservations for a particular vehicle within a set period of time.

17. A method according to claim 1, further comprising:
assigning by the server one or more gaps of time between use of the parking spaces in the parking pool.

18. A method according to claim 1, further comprising:
scheduling by the server use of the parking spaces in the parking pool by electrically-chargeable vehicles for use of charging capacity of the charging stations and the parking spaces in the parking pool.

19. A method according to claim 1, further comprising at least one of:
  providing dual use parking with the parking spaces in the parking pool by interleaving parking with charging by electrically-chargeable vehicles and parking only by electrically-chargeable vehicles and non-electrically-chargeable vehicles; and
  adjusting the use of the parking spaces based on parking restrictions and prohibitions, local restrictions and adjustable pricing, fixed rules by time of day, parking demand, charging demand or electricity market price.

20. A non-transitory computer readable storage medium storing code for executing on a computer system to perform a method, comprising:
  monitoring a vehicle charging station for electrically-chargeable vehicles at parking spaces in a parking pool;
  identifying via one or more sensors a number of the parking spaces in the parking pool that are currently-occupied by already-parked vehicles;
  further identifying any existing reservations to park in the parking spaces in the parking pool by yet-to-arrive vehicles;
  receiving from a user via one of a computing device and a parking kiosk a parking reservation request comprising a parking start time, parking duration, and parking with charging via a personal device; and
  monitoring use of the parking spaces in the parking pool that are not among the currently-occupied parking spaces nor among the parking spaces in the parking pool that will be used to fulfill the existing reservations as available parking spaces, comprising:
    granting the parking reservation request when the available parking spaces are available and notifying the user of the parking availability;
    when the parking request specifies parking with charging, determining by the server a duration of charge during the parking duration;
    determining by the server whether the parking duration exceeds the charging duration;
    subsequent to granting of the parking reservation request, scheduling by the server a span of time between an earliest time and a latest time during which charging will occur during the parking duration when the parking duration exceeds the charging duration;
    informing the user of the scheduled time span during which charging will occur; and
    controlling by the server, scheduling of the charging, the charging comprising delivery of electricity from the vehicle charging station to the electrically-chargeable vehicle based on the scheduled earliest time and the latest time of the time span during the parking duration, wherein the charging is scheduled as a summation of separate charging sessions during the parking duration.

21. A computer-implemented system for managing interchangeable EV charging-capable parking spaces, comprising:
  a vehicle charging station for electrically-chargeable vehicles at parking spaces in a parking pool;
  one or more sensors to identify a number of the parking spaces in the parking pool that are currently-occupied by already-parked vehicles and any existing reservations to park in the parking spaces in the parking pool by yet-to-arrive vehicles;
  one of a computing device and a parking kiosk to receive from a user a parking reservation request comprising a parking start time, parking duration, and parking with charging via a personal device; and
  a server configured to:
    monitor use of the parking spaces in the parking pool that are not among the currently-occupied parking spaces nor among the parking spaces in the parking pool that will be used to fulfill the existing reservations as available parking spaces by granting the parking reservation request when the available parking spaces are available, when the parking request specifies parking with charging, determining by the server a duration of charge during the parking duration, determining by the server whether the parking duration exceeds the charging duration and subsequent to granting of the parking reservation request, scheduling by the server a span of time between an earliest time and a latest time during which charging will occur during the parking duration when the parking duration exceeds the charging duration, informing the user of the scheduled time span during which charging will occur; and controlling by the server, scheduling of the charging, the charging comprising delivery of electricity from the vehicle charging station to the electrically-chargeable vehicle based on the scheduled earliest time and the latest time of the time span during the parking duration, wherein the charging is scheduled as a summation of separate charging sessions during the parking duration.

* * * * *